(12) United States Patent
Jeromson et al.

(10) Patent No.: US 11,650,607 B2
(45) Date of Patent: May 16, 2023

(54) ELECTRONICALLY CONTROLLABLE VALVES AND MIXING VALVES

(71) Applicant: UNOVA LIMITED, Dunedin (NZ)

(72) Inventors: Peter James Jeromson, Auckland (NZ); Bradley James Houghton, Dunedin (NZ)

(73) Assignee: UNOVA LIMITED, Dunedin (NZ)

( * ) Notice: Subject to any disclaimer, the term of this patent is extended or adjusted under 35 U.S.C. 154(b) by 149 days.

(21) Appl. No.: 16/636,734

(22) PCT Filed: Aug. 8, 2018

(86) PCT No.: PCT/NZ2018/050108
§ 371 (c)(1),
(2) Date: Feb. 5, 2020

(87) PCT Pub. No.: WO2019/031971
PCT Pub. Date: Feb. 14, 2019

(65) Prior Publication Data
US 2020/0218294 A1     Jul. 9, 2020

(30) Foreign Application Priority Data
Aug. 8, 2017 (NZ) ........................................ 734424

(51) Int. Cl.
*G05D 23/13* (2006.01)
*E03C 1/04* (2006.01)
*F16K 31/00* (2006.01)

(52) U.S. Cl.
CPC ............. *G05D 23/134* (2013.01); *E03C 1/04* (2013.01); *F16K 31/002* (2013.01); *G05D 23/1353* (2013.01); *G05D 23/1393* (2013.01)

(58) Field of Classification Search
CPC .......................... G05D 23/1393; G05D 23/134
See application file for complete search history.

(56) References Cited

U.S. PATENT DOCUMENTS 4,854,348 A * 8/1989 Tochikubo ......... G05D 23/1393
137/636.4
6,286,464 B1 * 9/2001 Abraham ........... G05D 23/1393
236/12.12
(Continued)

FOREIGN PATENT DOCUMENTS

CN        201065951 Y      5/2008
CN        101846207 A      9/2010
(Continued)

OTHER PUBLICATIONS

Translation of JP6458895 (Year: 1989).*
(Continued)

*Primary Examiner* — Schyler S Sanks
(74) *Attorney, Agent, or Firm* — Nixon & Vanderhye

(57) ABSTRACT

Two problems with existing electronically controlled mixing valves for domestic use is their size and difficulty accessing and repairing them. Their size means that they often become hidden behind wall linings, and because of the way in which they are plumbed into the pipework of a house, they are difficult to access and remove for repair or replacement. Disclosed is a compact and replaceable mixing valve cartridge that can be mated to a fixed fitting that is permanently plumbed into the pipework of a house. The compact size allows the cartridge to be positioned behind the type of removable face plates that are often installed over existing manually operated mixing valves. Simplified valve actuators and a compact mixing and temperature sensing configuration have facilitated the compact size. The valve cartridge can simply be accessed, unbolted and removed, without the need for extensive plumbing re-work.

20 Claims, 10 Drawing Sheets

(56) References Cited

U.S. PATENT DOCUMENTS

| | | | |
|---|---|---|---|
| 6,854,658 B1 | 2/2005 | Houghton et al. | |
| 7,261,126 B2 | 8/2007 | Jeromson et al. | |
| 2003/0088338 A1* | 5/2003 | Phillips | F16K 11/207 700/282 |
| 2005/0016592 A1 | 1/2005 | Jeromson et al. | |
| 2008/0112843 A1* | 5/2008 | Peel | G05D 23/1393 422/38 |
| 2012/0111429 A1 | 5/2012 | Nobili | |
| 2013/0340162 A1* | 12/2013 | Peel | E03C 1/0404 4/676 |
| 2014/0261749 A1 | 9/2014 | Chen | |
| 2014/0352799 A1* | 12/2014 | Rosko | C02F 1/78 137/237 |
| 2016/0334807 A1* | 11/2016 | Song | G05D 7/0635 |

FOREIGN PATENT DOCUMENTS

| | | |
|---|---|---|
| CN | 201909068 U | 7/2011 |
| EP | 3147744 | 3/2017 |
| GB | 2488755 | 9/2012 |
| JP | S64-58895 A | 3/1989 |
| JP | S6458895 * | 6/1989 |
| WO | WO 2016/118528 | 7/2016 |

OTHER PUBLICATIONS

Search Report issued in CN Patent Application No. 2018800511357 dated Jul. 13, 2021 with English translation provided.

International Search Report, PCT/NZ2018/050108, dated Nov. 22, 2018.

Office Action issued in Japanese Patent Application No. 2020-506214 dated Aug. 2, 2022.

Chinese Search Report issued in Chinese Patent Application No. 2018800511357 dated Oct. 9, 2022.

* cited by examiner

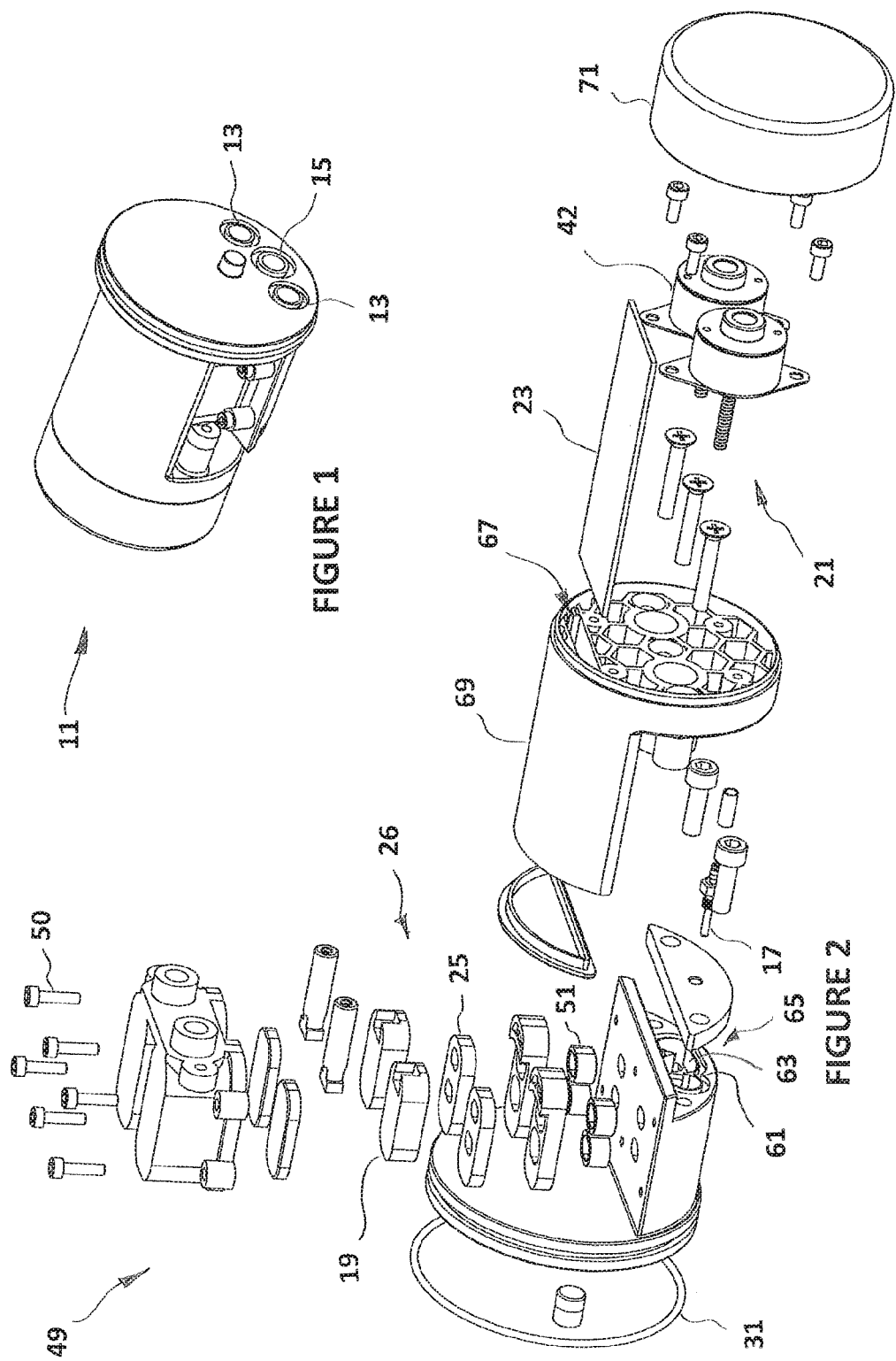

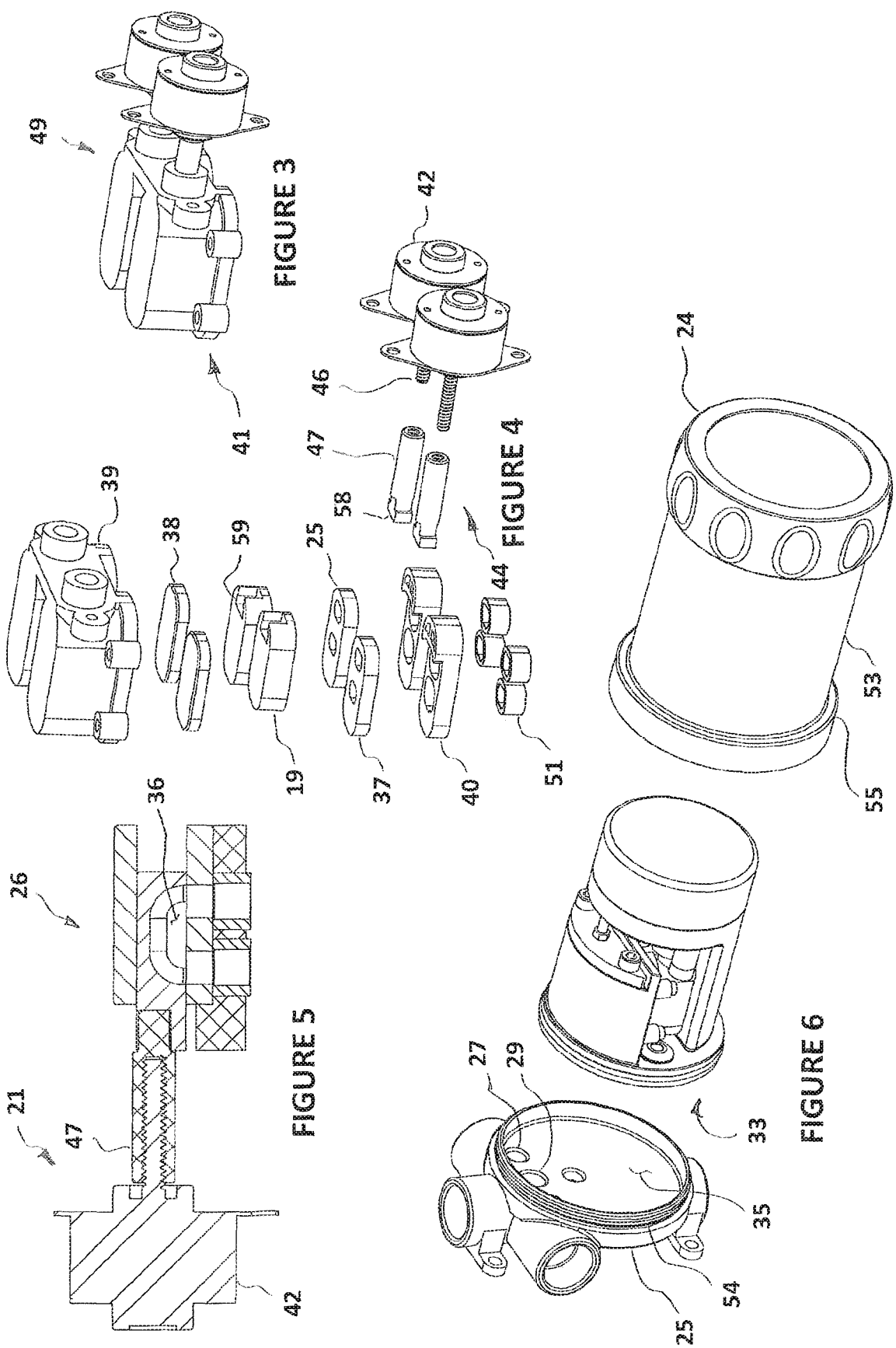

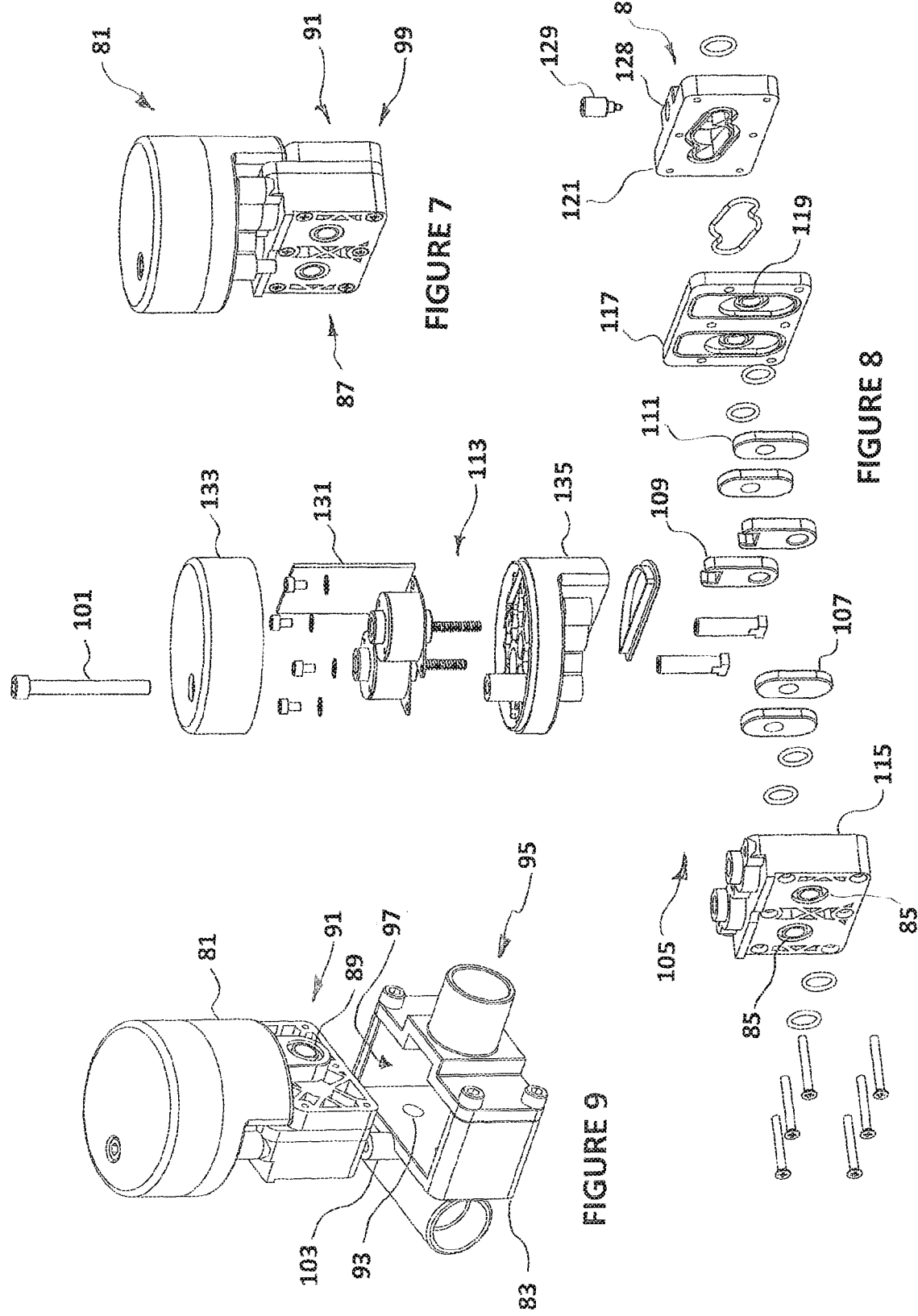

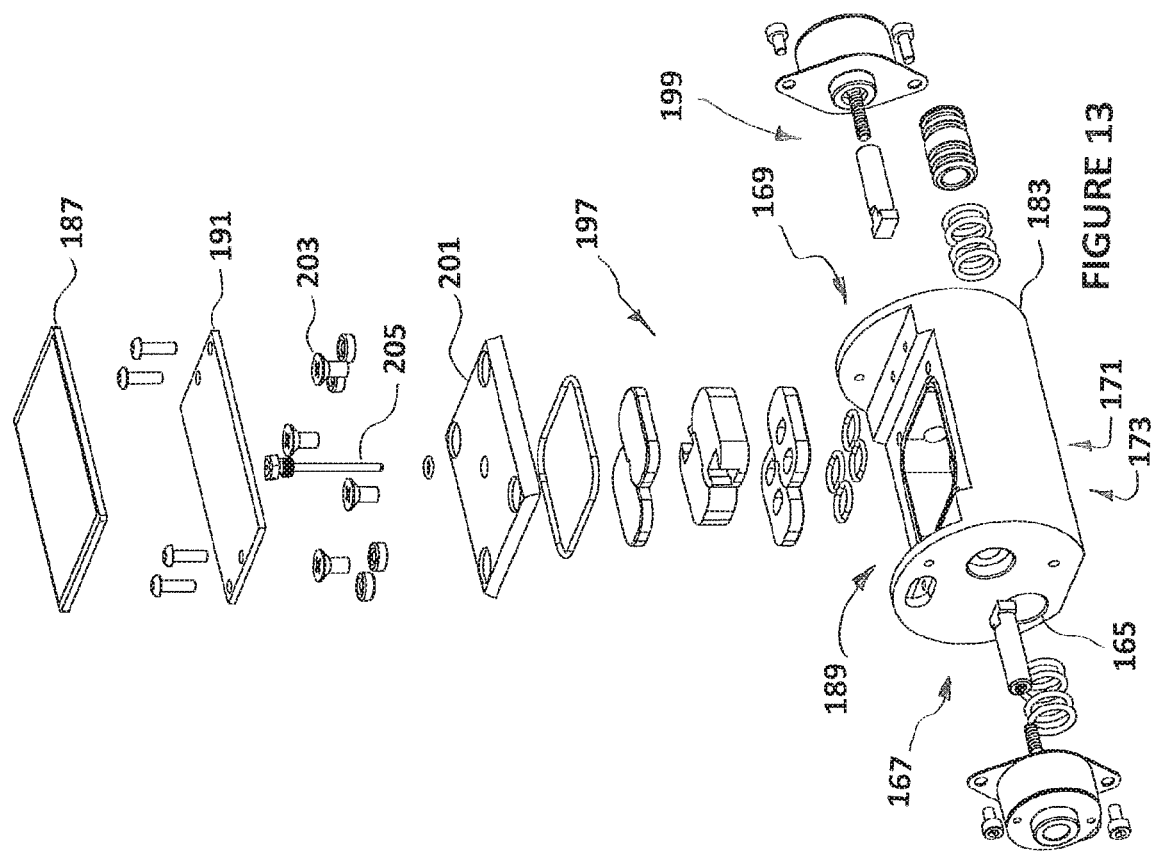
FIGURE 13
FIGURE 12
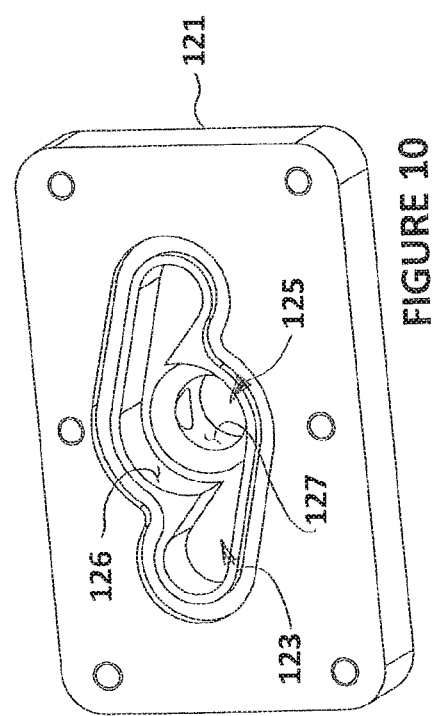
FIGURE 10
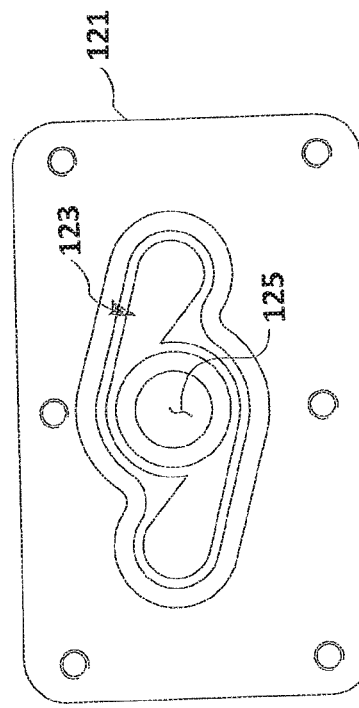
FIGURE 11
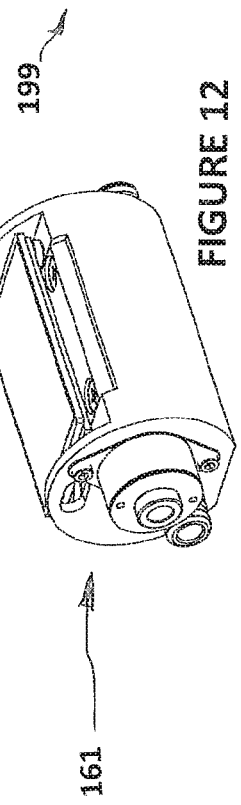

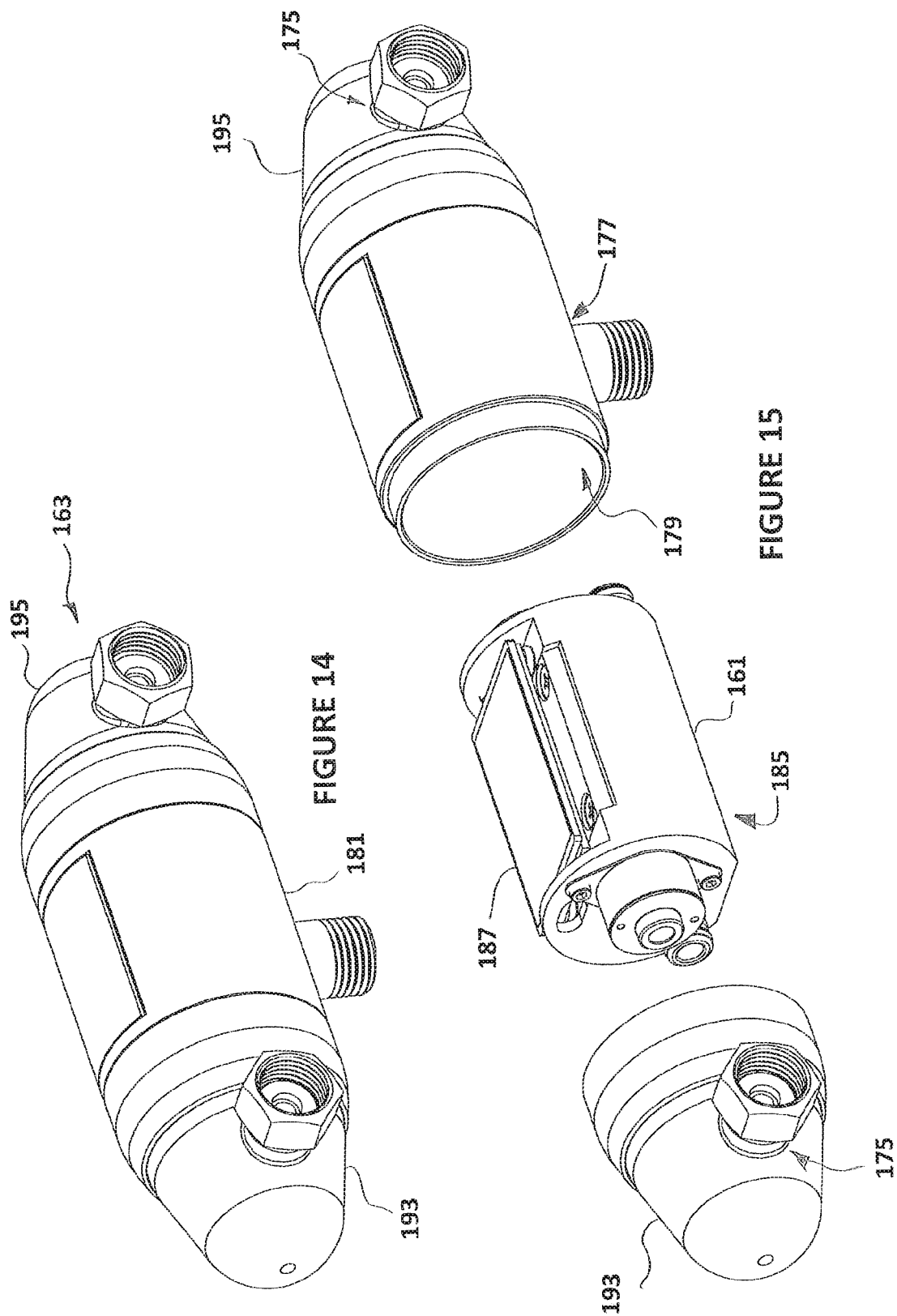

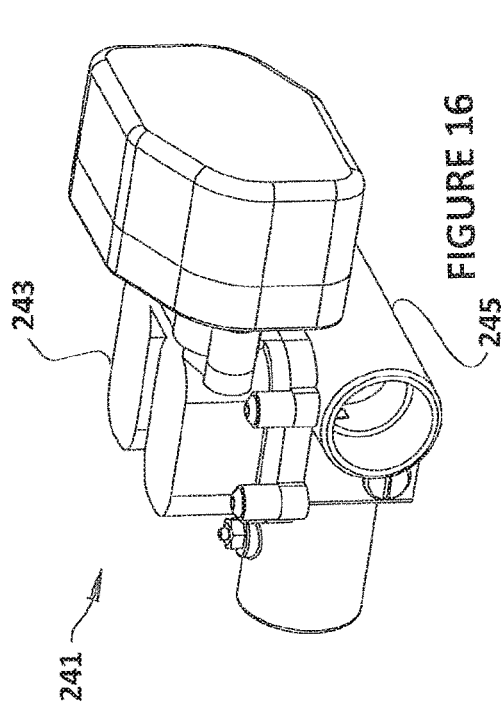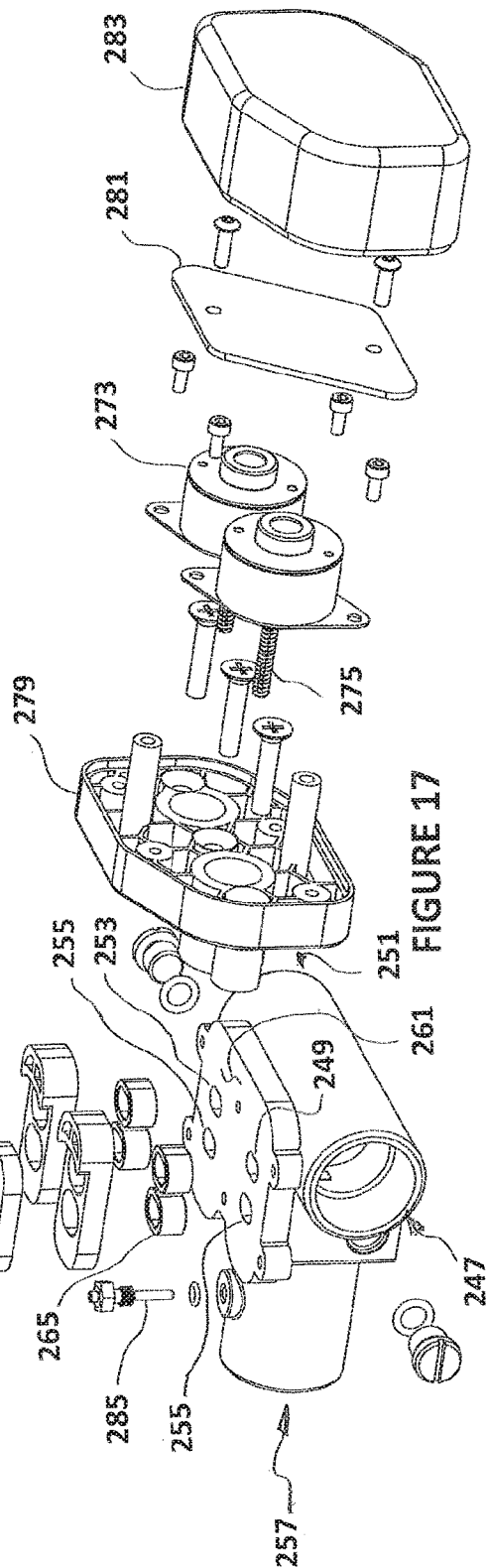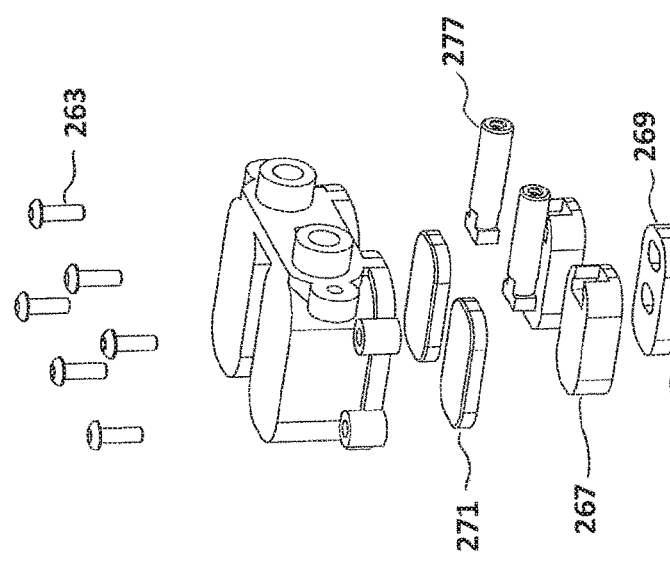

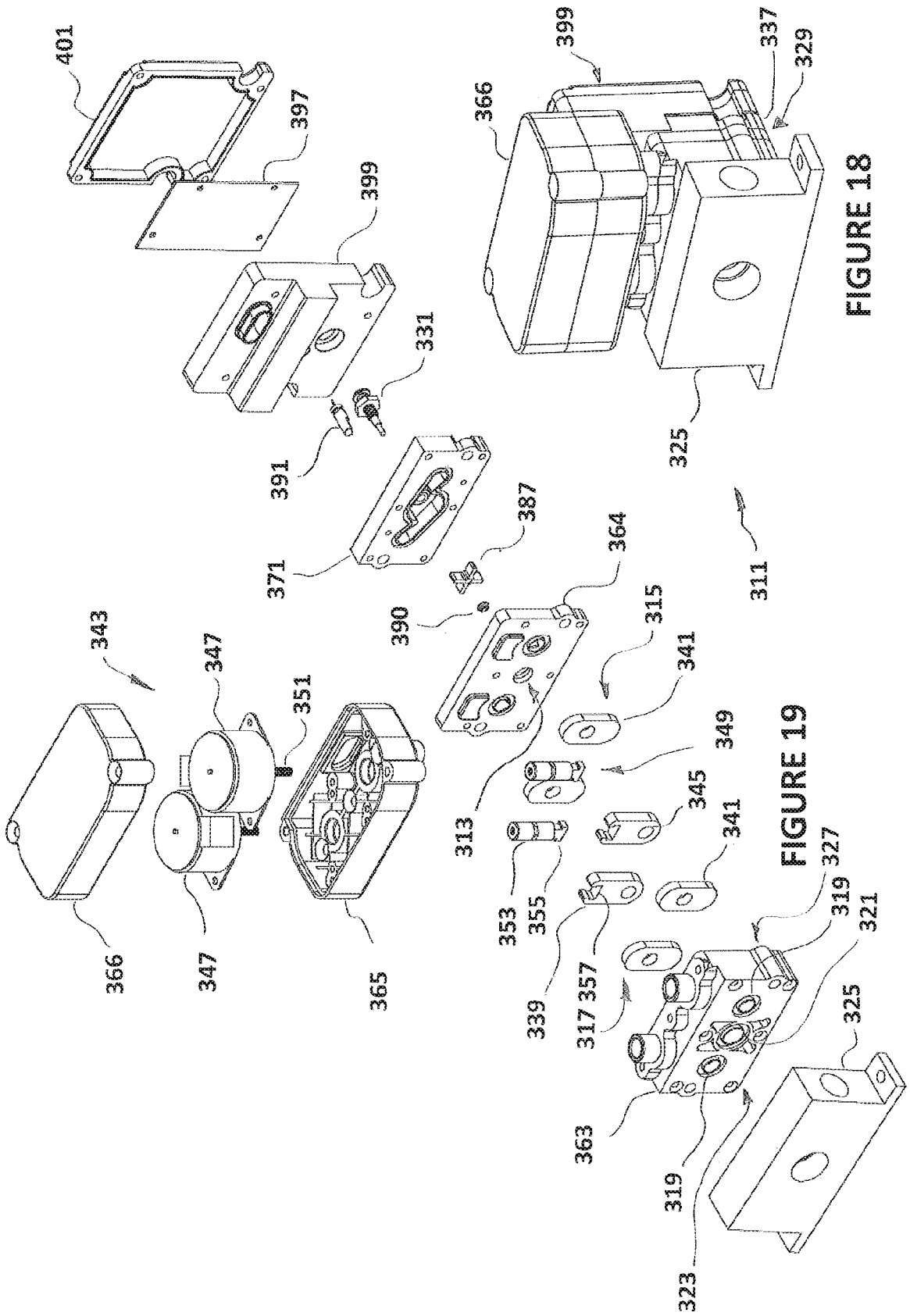

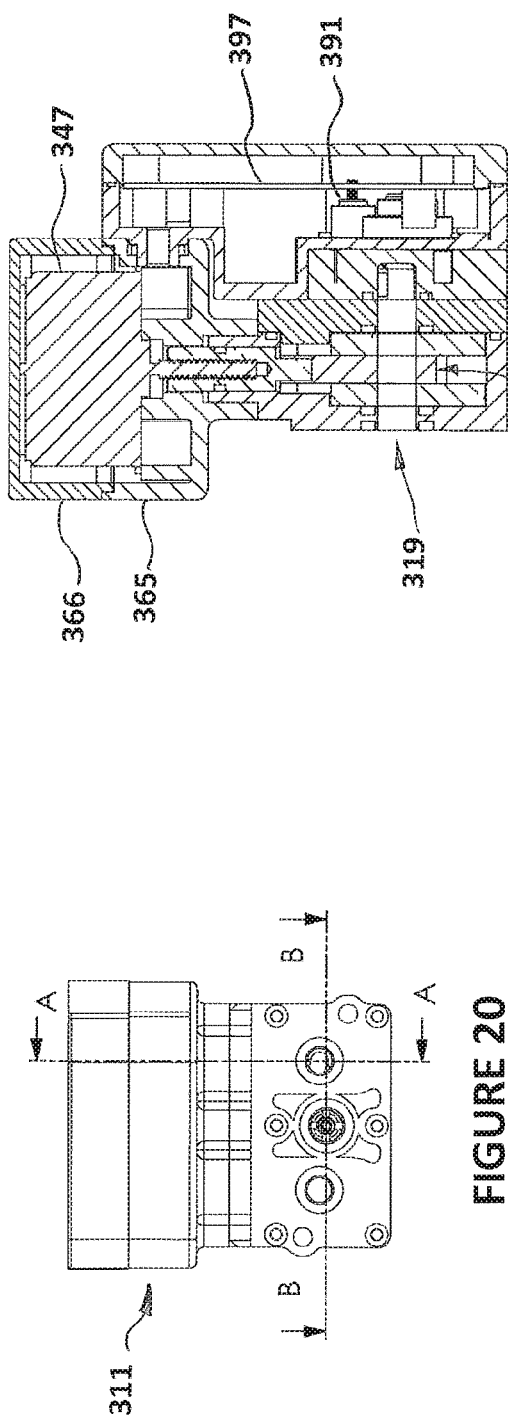
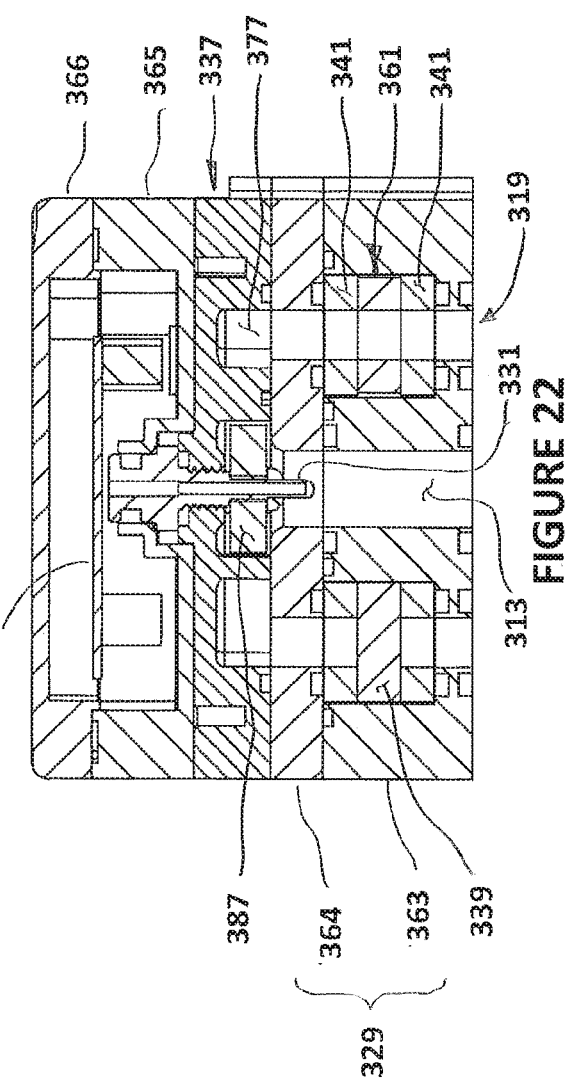

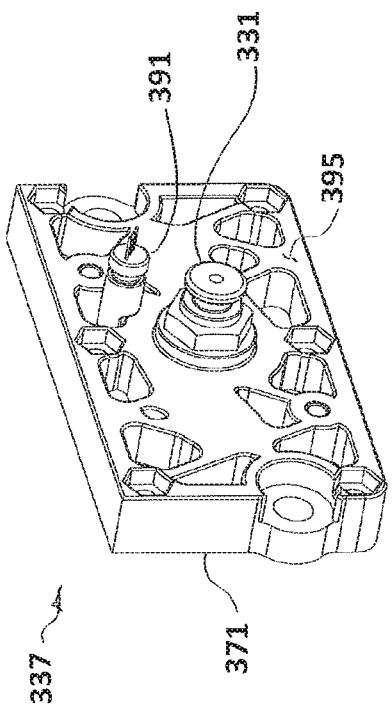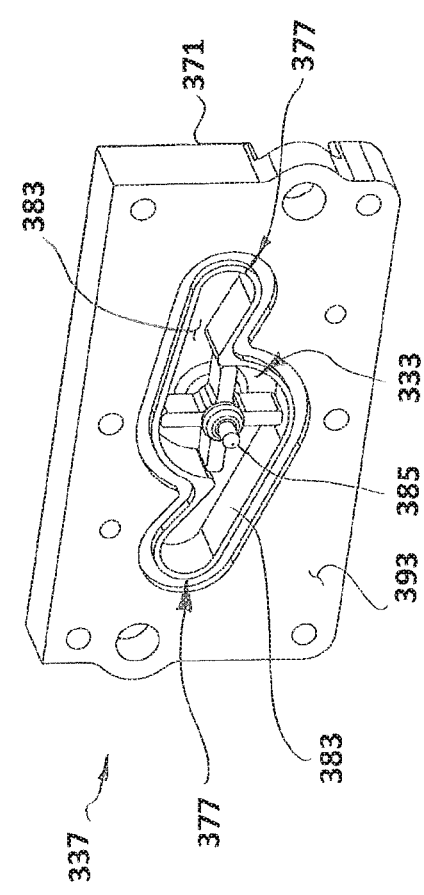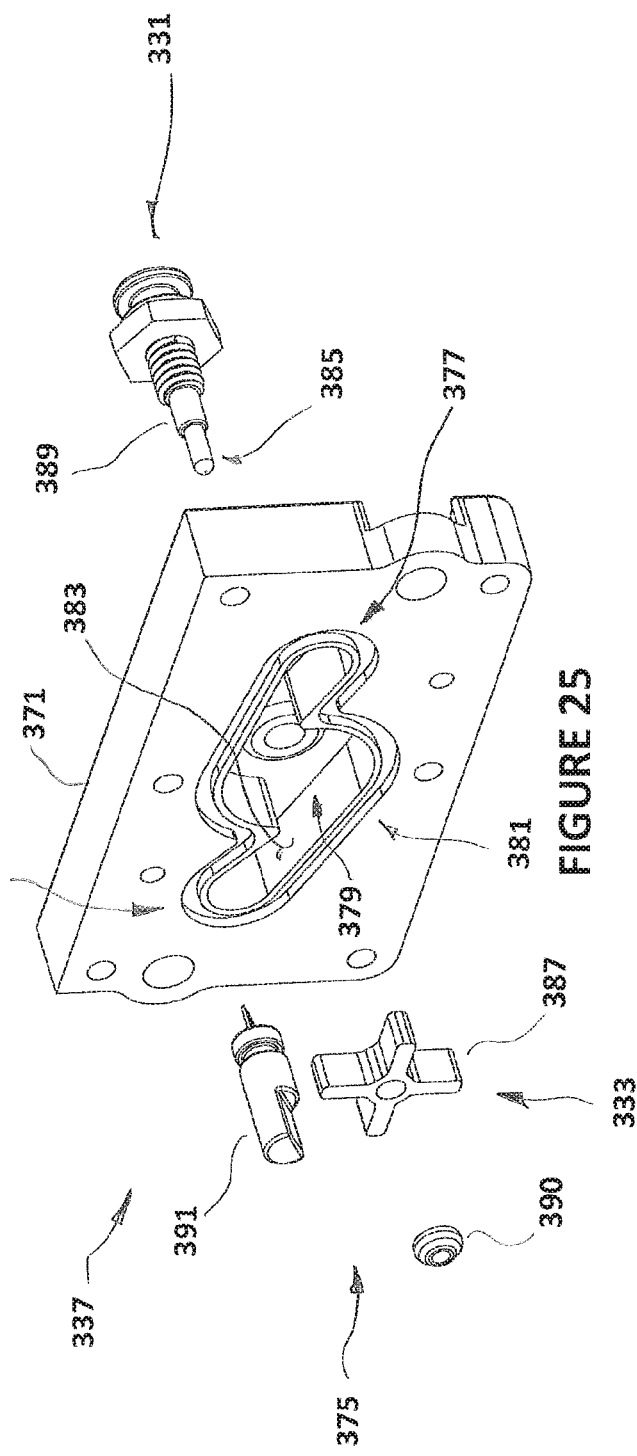

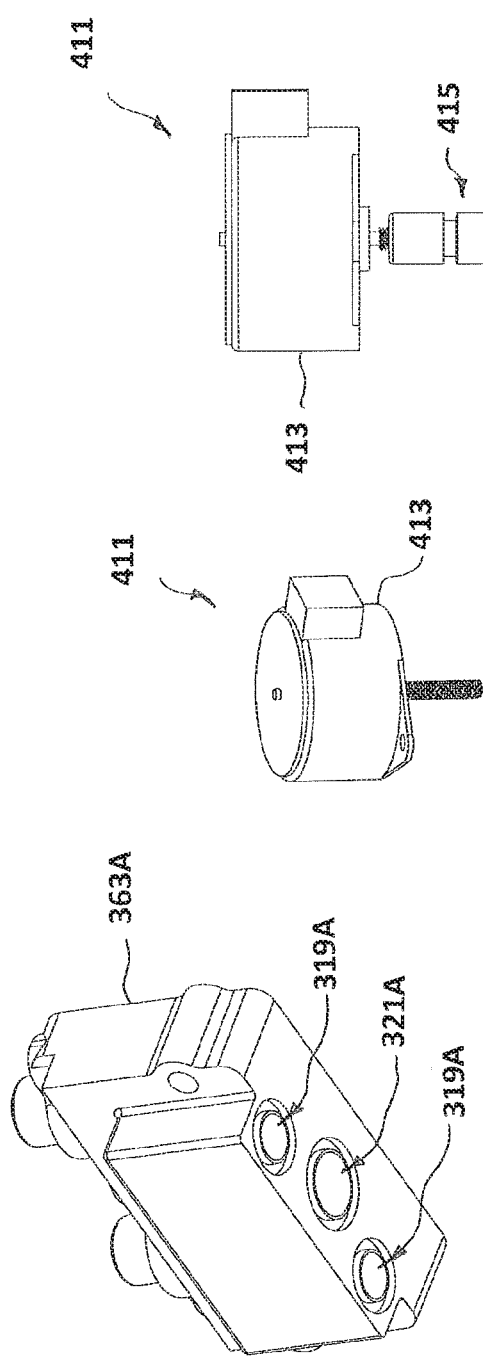
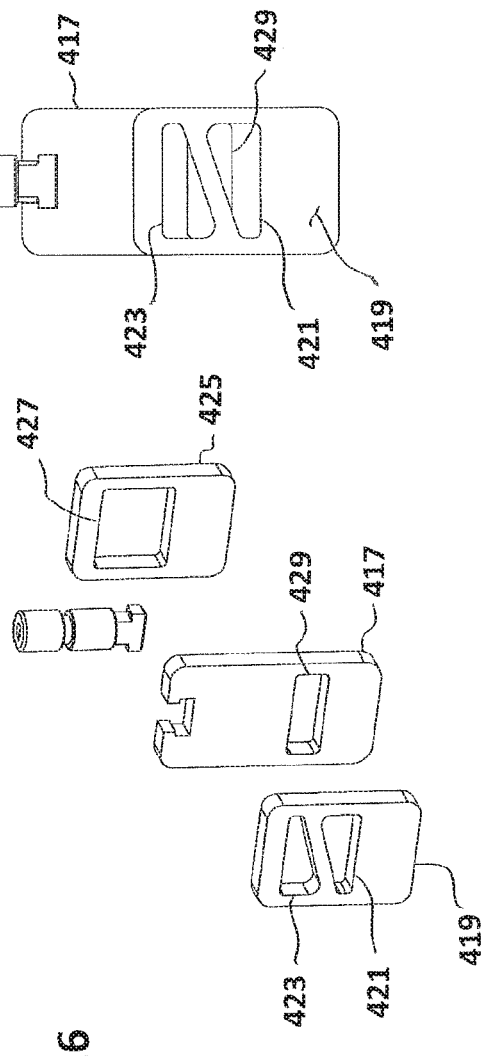
FIGURE 26
FIGURE 27
FIGURE 28

ELECTRONICALLY CONTROLLABLE VALVES AND MIXING VALVES

FIELD OF THE INVENTION

This invention relates to electronically controllable mixing valves, and in particular, but not exclusively to an electronically controllable mixing valve suitable for sanitation purposes.

BACKGROUND

For a number of years now the various valve manufacturers and other innovators have been developing electronically controllable valves of one type or another for use as sanitation mixing valves. These valves are used to supply heated water at an even temperature to a shower head or wash tap for example.

The valves are typically contained within a housing that contains the electronic control system, the actuators and the temperature sensing element, etc. The housings also have separate hot and cold water inlets and a mixed water outlet.

The mixing valve package is often controlled from a remote control panel and supplies thermostatically controlled water to a shower head or tap.

These devices can sometimes be quite large, and for this reason are often fitted within a wall cavity, cupboard, loft or ceiling space of a dwelling. A typical size for currently available devices is in the region of 250×200×70 mm. The devices are typically quite expensive, and some of them have significant reliability issues. The devices are connected directly to the plumbing of the dwelling, the connections typically requiring the assembly of water tight threaded connections.

The confined location of the devices, along with the need to break a number of water tight plumbing connections, for example threaded and sealed joints, to facilitate removal, often results in the devices being difficult and expensive to replace. Or alternatively, if they are placed in an area that is easily accessible, for example in a cupboard or loft, they may be some distance from the shower resulting in greater lag between setting a desired temperature and receiving water at that temperature at the shower head.

The reliability issues, the replacement cost, the difficulties gaining access to the devices, along with the difficulty in removing and replacing the devices, have resulted in a slow rate of consumer acceptance or purchases of these products.

What is needed is an electronically controllable mixing valve configuration that is smaller and which can be more easily installed, and simpler to repair or replace if problems occur. A smaller size would allow the mixing valve to be placed in a more desirable location, closer to a shower head for example, or under the cover plate of an interface unit. It would be helpful too, if the electronically controllable mixing valve was simpler, and more reliable and had a lower manufacturing cost.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is therefore an object of the present invention to provide an electronically controllable valve or valve cartridge, or parts thereof, which will at least go some way towards overcoming one or more of the above mentioned problems, or at least provide the public with a useful choice.

STATEMENTS OF THE INVENTION

Accordingly, in a first aspect, the invention may broadly be said to consist in a fluid control valve assembly having, ¿ a movable valve member,
¿ at least one fixed valve member, and
¿ a valve actuation device;

and the fluid control valve assembly is configured such that when in use the movable valve member is moved by the valve actuation device in a linear motion relative to the or each fixed valve member to control the flow of a fluid through the fluid control valve assembly.

Preferably the movable valve member and the at least one fixed valve member are valve members made of a ceramic based material.

Preferably the fluid control valve assembly includes two fixed valve members and the movable valve member is sandwiched between the two fixed valve members.

Preferably the movable valve member and the at least one fixed valve member each include a passage through which the flow of a fluid is controlled by the fluid control valve assembly.

Preferably the movable valve member is elongate in shape, and the linear movement of the movable valve member is aligned with the length of the elongate shape.

While the valve actuation device can include a manually operated lever or a rotatable knob or handle, or a powered actuator, preferably the valve actuation device is a powered actuator that includes an electric motor.

Preferably the valve actuation device includes the electric motor and a linear actuator, the linear actuator being coupled to the movable valve member.

Preferably the linear actuator includes a lead screw assembly and the movable valve member is coupled to the lead screw assembly.

Preferably the electric motor turns a threaded spindle of the lead screw assembly.

Preferably the threaded spindle is an integral part of a main shaft of the electric motor.

Preferably the lead screw assembly includes a driven nut or sleeve, the nut or sleeve having a thread that is complimentary to a thread on the threaded spindle.

Preferably the driven nut or sleeve is linked or coupled to the movable valve member.

Preferably the movable valve member includes a slot or a protrusion configured to receive a complimentary joint feature of the linear actuator, the slot or protrusion being configured to allow the complimentary joint feature of the linear actuator to slide into engagement with the slot or protrusion and to prevent rotation of the complimentary feature of the linear actuator relative to the movable valve member and to prevent linear movement of the complimentary feature of the linear actuator relative to the movable valve member in the intended direction of movement of the movable valve member when the fluid control valve assembly is in use.

Preferably the slot or protrusion is a slot or protrusion having a 'T_shaped profile.

Preferably the fluid control valve assembly includes a valve member housing that is configured to hold the movable valve member in sealing contact with the or each fixed valve member.

Preferably the valve member housing includes guides configured to guide the linear movement of the movable valve member.

Preferably the valve member housing comprises a box member and a lid member, the two housing members both being made of a plastics material and being welded together about the movable valve member and the or each fixed valve member. Optionally the two housing members can be held together with mechanical fasteners, and they can be made of metal, for example from brass.

Preferably the electric motor is held fixed relative to the valve member housing.

Optionally the at least one fixed valve member is in the form of a valve seat formed in the valve member housing.

In a second aspect, the invention may broadly be said to consist in a mixing and sensing module for an electronically controllable fluid mixing valve, the module having a body and a temperature sensing means, the body having two or more inlet regions, a mixing chamber and an outlet region, with each inlet region being connected by an associated transfer passage to the mixing chamber, the mixing chamber being in communication with the inlet regions and in communication with the outlet region, and each transfer passage is configured to induce a swirling motion in a fluid when the fluid enters the mixing chamber, and a temperature sensing element of the temperature sensing means is situated such that the sensing element is able to sense the temperature of the fluid as the fluid passes toward or through the outlet region.

Preferably the mixing chamber is a cylindrical mixing chamber and the transfer passages each direct the fluid in a direction that is substantially tangential to a circle defining a perimeter of the cylindrical mixing chamber.

Preferably the transfer passages have a larger cross sectional area adjacent to the inlet regions than adjacent to the mixing chamber.

Preferably the mixing and sensing module also includes a flow sensing means.

Preferably the flow sensing means includes a rotatable element that is rotated by swirling fluid within the mixing chamber.

Preferably the rotatable element is in the form of a paddle wheel.

Preferably the temperature sensing element is supported on a probe or shaft, and the rotatable element rotates about an axis that is coaxial with the shaft or probe.

Preferably the flow sensing means includes a proximity sensing transducer.

Preferably the rotatable element of the flow sensing means includes one or more magnetic sensing objects configured to be sensed by the proximity sensing transducer.

Preferably the flow of fluid into the inlet regions and the flow of fluid out of the outlet region are all flows that pass through a single plane.

Preferably the mixing and sensing module has two inlet regions.

Preferably the body has two substantially parallel faces, a first face containing the inlet regions and the outlet region, and a second face through which the temperature sensing element is installed, the mixing chamber being situated between the first face and the second face.

Preferably the body is configured to receive fluid from two or more fluid inlet supplies and to direct mixed fluid to a mixed fluid conduit.

In a third aspect, the invention may broadly be said to consist in a mixing valve assembly, the mixing valve assembly having two or more fluid control valve assemblies substantially as specified herein.

Preferably the mixing valve assembly also includes at least one mixing and sensing module substantially as specified herein.

Preferably the mixing valve assembly is an electronically controllable mixing valve assembly having a control system configured to receive inputs from the or each mixing and sensing module and to control the operation of a powered actuator of the or each fluid control valve assembly.

Preferably the mixing valve assembly is in the form of a replaceable valve cartridge.

Preferably the mixing valve assembly has two inlet ports and one outlet port, with all of the ports being situated on a single substantially flat face.

Preferably the replaceable valve cartridge is configured to allow a mechanical fastening system to hold the replaceable valve cartridge securely to a fixable valve fitting.

In a fourth aspect, the invention may broadly be said to consist in a valve assembly, the valve assembly having;

¿ a movable valve member,

¿ a valve seat,

¿ an electric motor,

¿ a lead screw assembly, and

¿ a valve member housing;

and the valve member housing is configured to hold the movable valve member against the valve seat and to allow linear movement of the movable valve member only in relation to the valve seat, and the valve assembly is configured such that the lead screw assembly is driven by the electric motor and the lead screw assembly is configured to move the movable valve member to produce the linear movement of the movable valve member to control flow of a fluid through the valve assembly.

Preferably the movable valve member and the valve seat are made of a ceramic material.

Preferably the valve member housing comprises a top member and a bottom member, the two members both being made of a plastics material and being welded together about the movable valve member and valve seat. Optionally the two housing members can be held together with mechanical fasteners, and they can be made of metal, for example from brass.

Preferably the valve assembly further includes a top plate made of a ceramics material and the movable valve member is sandwiched between the top plate and the valve seat.

Preferably a screw shaft or lead screw of the lead screw assembly is driven by the electric motor.

Preferably a driven nut of the lead screw assembly is connected to the movable valve member.

Preferably the driven nut is in the form of a driven sleeve having an internal thread along at least a part of the length of the driven sleeve.

Preferably the driven sleeve is connected to the movable valve member in such a manner that the driven sleeve cannot rotate in relation to the movable valve member.

Preferably the movable valve member includes a 'C_shaped passageway and a first open end of the 'C_shaped passageway communicates with a first passageway in the valve seat member and a second open end of the 'C_shaped passageway communicates with a second passageway in the valve seat member when the valve assembly is in an open configuration.

Optionally the movable valve member includes a through passage which passes from one si de of the movable valve member to the other, and the through passage communicates with a passage way in the valve seat and a passageway in the top member when the valve assembly is in an open configuration.

Preferably the valve member housing has a fluid inlet port and a fluid outlet port.

In a fifth aspect, the invention may broadly be said to consist in a valve module assembly comprising two or more valve assemblies substantially as specified herein.

In a sixth aspect, the invention may broadly be said to consist in an electronically controllable mixing valve cartridge, the valve cartridge having;

¿ at least two fluid inlets and at least one fluid outlet,

¿ at least one temperature sensor,

¿ at least one movable valve member and at least one actuator configured to move the or each movable valve member, and ¿ an electronic control system adapted to receive inputs from an input device and from the or each temperature sensor, and to control the operation of the or each actuator;

wherein the valve cartridge is configured to engage with a complimentary fixable valve fitting, the fixable valve fitting being fixable to a supporting member or members and being connectable to the pipework of a plumbing installation and having complimentary fluid outlets and fluid inlets, the engagement between the cartridge and the fixable valve fitting being capable of establishing a sealed connection between each fluid inlet and each fluid outlet of the valve cartridge and the complimentary fluid outlets and fluid inlets of the fixable valve fitting.

Preferably a direction of flow of a fluid through the fluid inlets and through the or each fluid outlet is a direction of flow that is substantially aligned with a direction of movement of the or each movable valve member.

Preferably the electronically controllable mixing valve cartridge includes at least one valve module assembly substantially as specified herein.

Preferably the or each actuator is an electrically powered actuator.

Preferably the sealed connection between each fluid inlet and each fluid outlet of the valve cartridge and the complimentary fluid outlets and fluid inlets of the fixable valve fitting includes an elastomeric seal which provides a fluid tight seal between a surface on the valve cartridge and a surface on the fixable valve fitting.

Preferably the valve cartridge is in the form of a replaceable valve cartridge.

Preferably the valve cartridge is configured to allow a mechanical fastening system to hold the valve cartridge securely to the fixable valve fitting.

Preferably the mechanical fastening system includes a bayonet style fastening system, or one or more mechanical fasteners, for example, machine screws.

Preferably the or each movable valve member is a ceramic valve member.

Preferably the valve cartridge includes ceramic valve seats configured to mate with the ceramic movable valve members.

Preferably the or each electrically powered actuator includes an electric motor.

Preferably the or each electrically powered actuator includes a linear actuator.

Preferably the or each linear actuator includes a lead screw assembly.

Preferably a direction of flow of a fluid through the fluid inlets and through the or each fluid outlet is a direction of flow that is substantially aligned with a direction of operation of the or each linear actuator.

Preferably the electronic control system is adapted to receive inputs from a local or remote input device or user interface via electromagnetic signals, for example via Wifi, Bluetooth or inductive data transfer.

Optionally the electronic control system is adapted to receive mechanical inputs from a local input device or user interface having a manually operated knob, lever or similarly manually controlled device.

Optionally the electronically controllable mixing valve cartridge includes a user interface.

Preferably the electronic control system is a closed loop control system.

Preferably the or each temperature sensor is situated within the or each fluid outlet of the valve cartridge.

Preferably the conduit or conduits leading to the or each fluid outlet of the valve cartridge are configured to induce swirling into fluid flowing through the or each fluid outlet.

Preferably the electronically controllable mixing valve cartridge includes a fluid mixing chamber.

Preferably the fluid mixing chamber is situated within a fluid mixing module adapted to;

¿ receive a flow of fluid from two or more separate sources,

¿ to combine the fluid flows, and

¿ to actively mix the fluid flows as they meet.

Preferably the fluid mixing module actively mixes the fluid flows by swirling the fluid flows in the region in which the fluid flows meet.

Preferably the fluid mixing module includes a mixing chamber in which the fluid flows meet, the mixing chamber having a first diameter in a region where the incoming fluid flows enter the mixing chamber, and the mixing chamber having a second and smaller diameter where the mixed fluids exit the mixing chamber.

Preferably the mixing chamber includes a radiused funnelling section at the transition from the first diameter to the second diameter.

Preferably the fluid mixing module is configured to mix two fluid flows and the two fluid flows each enter the mixing chamber at opposite sides of the mixing chamber.

Preferably the fluid mixing module is configured such that the fluid flows each enter the mixing chamber substantially in a direction that is tangential to the perimeter of the part of the mixing chamber defined by the first diameter.

Preferably the flow paths in the fluid mixing module for the fluids entering the mixing chamber narrow as the flow paths approach the mixing chamber.

Preferably the fluid mixing module is configured to accommodate at least one temperature sensor.

Preferably the fluid mixing module accommodates the at least one temperature sensor within an exit section of the module where the mixed fluid flows exit.

Preferably the at least one temperature sensor accommodated by the fluid mixing module is situated to sense fluid temperature as the fluid exits the mixing module.

Optionally the electronically controllable mixing valve cartridge includes one or more flow sensors.

Preferably the electronically controllable mixing valve cartridge includes means to hold stored electrical energy, for example capacitors or provisions for one or more batteries.

Optionally the electronically controllable mixing valve cartridge includes a turbine generator configured to generate electrical energy when fluid is flowing through the valve cartridge.

Optionally the electronically controllable mixing valve cartridge includes an emergency shut-off valve, for example a wax tube operated shut off or diverter valve configured to prevent fluid above a selected temperature from exiting the valve cartridge.

Preferably the electronically controllable mixing valve cartridge is configured such that each fluid inlet and each fluid outlet of the valve cartridge is situated on a single mating face and is configured to engage with fluid outlets and fluid inlets on a single mating face of a fixable valve fitting.

Optionally the electronically controllable mixing valve cartridge is configured such that the fluid inlets of the valve cartridge are situated on a first mating face of the valve cartridge and the or each fluid outlet of the valve cartridge is situated on a second mating face of the valve cartridge, and the valve cartridge is configured to engage with fluid outlets and fluid inlets situated on two separate faces of a socket or cavity of a fixable valve fitting.

Optionally the electronically controllable mixing valve cartridge is configured such that a first fluid inlet of the valve cartridge is situated on a first side of the valve cartridge and a second fluid inlet is situated on a second and opposite side of the valve cartridge and the or each fluid outlet of the valve cartridge is situated at a location between the first side and the second side of the valve cartridge, and the valve cartridge is configured to sit within a fixable valve fitting housing having a first fluid outlet at a first end of the housing and a second fluid outlet at a second and opposite end of the housing and a fluid inlet situated at a location between the first end and the second end of the fixable valve fitting housing.

Preferably the fixable valve fitting is permanently connectable to the pipework of a plumbing installation, for example using threaded pipe connections or glued pipe connections.

Optionally the fixable valve fitting comprises a housing configured to house the electronically controllable mixing valve cartridge.

In a seventh aspect, the invention may broadly be said to consist in a mixing valve assembly incorporating at least one electronically controllable mixing valve cartridge substantially as specified herein and at least one complimentary fixable valve fitting.

Preferably the fixable valve fitting is configured to mate with, and form fluid tight seals with just one surface of the or each electronically controllable mixing valve cartridge.

Optionally the fixable valve fitting includes a socket having fluid outlets and fluid inlets situated on different faces of the socket and is configured to mate with a complimentary tongue section of the electronically controllable mixing valve cartridge.

Optionally the fixable valve fitting includes a housing configured to completely house the electronically controllable mixing valve cartridge.

In an eighth aspect, the invention may broadly be said to consist in an electronically controllable mixing valve cartridge, the valve cartridge having;

¿ at least two fluid inlets and at least one fluid outlet,

¿ at least one temperature sensor,

¿ at least one movable valve member and at least one actuator configured to move the or each movable valve member, and ¿ an electronic control system configured for receiving inputs from an input device and adapted to receive inputs from the or each temperature sensor and to control the operation of the or each actuator.

Preferably the or each actuator includes an electric motor.

Preferably a direction of flow of a fluid through the fluid inlets and through the or each fluid outlet is a direction of flow that is substantially aligned with a rotational axis of the or each electric motor.

Preferably the or each actuator includes a linear actuator.

Preferably a direction of flow of a fluid through the fluid inlets and through the or each fluid outlet is a direction of flow that is substantially aligned with a direction of operation of the or each linear actuator.

Preferably a direction of flow of a fluid through the fluid inlets and through the or each fluid outlet is a direction of flow that is substantially aligned with a direction of movement of the or each movable valve member.

Preferably the valve cartridge is configured for engagement with a complimentary fixable valve fitting that is connectable to the pipework of a plumbing installation and has complimentary fluid outlets and a fluid inlet or fluid inlets.

Preferably the valve cartridge includes one or more mating features configured for establishing a sealed connection between each fluid inlet and the or each fluid outlet of the valve cartridge and the fixable valve fitting.

Preferably the valve cartridge includes a mixing chamber that is configured to mix two or more fluid flows and which is situated downstream of the or each movable valve member and upstream of the at least one temperature sensor.

Preferably the valve cartridge includes transfer passages through which fluid flows as the fluid approaches the mixing chamber, and the transfer passages are configured to create a swirling motion within the mixing chamber.

Preferably the mixing chamber is substantially cylindrical in shape and the transfer passages are each configured to direct the fluid in a direction that is substantially tangential to a circle defining a perimeter of the cylindrical mixing chamber.

Preferably the cross sectional area of the transfer passages reduces in a direction of flow towards the mixing chamber.

Preferably the valve cartridge also includes a flow sensing means.

Preferably the flow sensing means includes a rotatable element that is rotated by swirling fluid within the mixing chamber.

Preferably the rotatable element is in the form of a paddle wheel.

Preferably a temperature sensing element of the temperature sensor is supported on a probe or shaft, and the rotatable element rotates about an axis that is coaxial with the shaft or probe.

Preferably the flow sensing means includes a magnetic or proximity sensing transducer.

Preferably the rotatable element of the flow sensing means includes one or more magnetic sensing objects configured to be sensed by a hall effect sensing transducer.

Preferably the or each linear actuator includes a lead screw assembly.

Preferably the or each movable valve member is a ceramic valve member.

Preferably the or each movable valve member is elongate in shape, and a linear movement of the movable valve member is aligned with a length of the elongate shape.

Preferably the valve cartridge includes two fixed valve members associated with the or each movable valve member, and the or each movable valve member is sandwiched between its associated two fixed valve members.

Preferably the at least two fluid inlets and the at least one fluid outlet are all situated on a single substantially flat face.

Preferably the or each mating feature of the valve cartridge includes a formation or formations configured to retain one or more elastomeric seals.

Preferably the valve cartridge is configured to enable a mechanical fastening system to hold the valve cartridge securely to the fixable valve fitting.

In a ninth aspect, the invention may broadly be said to consist in an electronically controllable mixing valve assembly including an electronically controllable mixing valve cartridge substantially as specified herein and a fixable valve fitting, the electronically controllable mixing valve cartridge being connectable to the fixable valve fitting using a mechanical fastening system, and the fixable valve fitting being connectable to a plumbing system of a building and configured to direct fluid to the at least two fluid inlets of the valve cartridge and to receive fluid from the at least one fluid outlet of the valve cartridge, and being configured to allow leak resistant seals to be established between the or each mating feature of the electronically controllable mixing valve cartridge and complimentary mating features of the fixable valve fitting.

In a tenth aspect, the invention may broadly be said to consist in a method of repairing an electronically controllable valve, the method including the steps of;

¿ removing a mal-functioning electronically controllable mixing valve cartridge substantially as specified herein from a fixable valve fitting, and ¿ fitting a replacement electronically controllable mixing valve cartridge into the fixable valve fitting.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Further aspects of the present invention will become apparent from the following description which is given by way of example only and with reference to the accompanying drawings in which:

FIG. 1 is a perspective view of a first example of an electronically controllable mixing valve cartridge according to the present invention, FIG. 2 is an exploded perspective view of the first example of an electronically controllable mixing valve cartridge, FIG. 3 is a perspective view of a valve module assembly of the first example of an electronically controllable mixing valve cartridge, FIG. 4 is an exploded perspective view of the valve module assembly, FIG. 5 is a cross sectional view of the valve module assembly, FIG. 6 is a perspective view of a first mixing valve assembly incorporating the first example of an electronically controllable mixing valve cartridge, FIG. 7 is a perspective view showing a second example of an electronically controllable mixing valve cartridge, FIG. 8 is an exploded perspective view of the second example of an electronically controllable mixing valve cartridge, FIG. 9 is a perspective view of a second mixing valve assembly incorporating the second example of an electronically controllable mixing valve cartridge, FIG. 10 is a perspective view of a fluid mixing module of the second example of an electronically controllable mixing valve cartridge, FIG. 11 is a plan view of the fluid mixing module, FIG. 12 is a perspective view showing a third example of an electronically controllable mixing valve cartridge, FIG. 13 is an exploded perspective view of the third example of an electronically controllable mixing valve cartridge, FIG. 14 is a perspective view of a third mixing valve assembly incorporating the third example of an electronically controllable mixing valve cartridge, FIG. 15 is an exploded perspective view of the third mixing valve assembly, FIG. 16 is a perspective view of a fourth mixing valve assembly, FIG. 17 is an exploded perspective view of the fourth mixing valve assembly, FIG. 18 is a perspective view of a fifth example of a mixing valve assembly, FIG. 19 is an exploded perspective view of the fifth example of a mixing valve assembly, FIG. 20 is a rear elevation view of the fifth example of a mixing valve assembly in which cross sectional views AA and BB are defined, FIG. 21 is a cross sectional view AA of the fifth example of a mixing valve assembly, FIG. 22 is a cross sectional view BB of the fifth example of a mixing valve assembly, FIG. 23 is a front perspective view of a mixing and sensing module of the fifth example of a mixing valve assembly, FIG. 24 is a rear perspective view of the mixing and sensing module of the fifth example of a mixing valve assembly, FIG. 25 is an exploded perspective view of the mixing and sensing module of the fifth example of a mixing valve assembly, FIG. 26 is a perspective view of an alternative box member for a valve housing of the fifth example of a mixing valve assembly FIG. 27 is an exploded perspective view of an alternative valve member configuration, and FIG. 28 is a front view of the alternative valve member configuration.

With reference to FIGS. 1 to 15 and 18 to 26, four examples of a removable electronically controllable mixing valve cartridge according to the present invention will be described below. FIGS. 16 and 17 relate to a mixing valve assembly having features similar to the electronically controllable mixing valve cartridges but without the feature of a removable cartridge. FIGS. 27 and 28 show an alternative valve member configuration for a mixing valve that is more compact and uses only actuator.

In each of the first three examples, and in the fifth example, the electronically controllable mixing valve cartridges have been designed as replaceable or removable units configured for engagement with, or for use in, mixing valve assemblies, for example in mixing valve assemblies for use in supplying fluids, for example water, at a desired and safe temperature to a shower head, a hand basin, an industrial process, etc.

The mixing valve assemblies will typically include one replaceable electronically controllable mixing valve cartridge that is configured to mate with a complimentary fixable valve fitting. The fixable valve fitting will typically be a fitting or housing that is permanently, or semi permanently fitted to the plumbing installation of a residential, commercial or industrial property or building.

Both the electronically controllable mixing valve cartridge and the fixable valve fitting are configured to mate with each other and to form fluid tight seals at the interface between the electronically controllable mixing valve cartridge and the fixable valve fitting. Mating features of the valve cartridges are configured to mate with complimentary mating features of the fixable valve fittings. While the operational features of the three examples of cartridges described herein are largely the same, it is the way in which the cartridges mate with their respective fixable valve fittings that is the main difference in each case.

For example, some of the cartridges are configured to mate or form a fluid tight seal with just one surface of a fixable valve fitting. Another cartridge has a tongue section that is configured to mate with a complimentary socket of a fixable valve fitting and the tongue forms a fluid tight seal with two internal surfaces of the socket of the fixable valve fitting. In yet another example, the fixable valve fitting includes a housing configured to completely house the electronically controllable mixing valve cartridge, and the fluid tight seals are formed on three faces of the cartridge.

The electronically controllable mixing valve cartridges have been designed to provide a simplified method of repairing a mal-functioning electronically controllable valve. Instead of having to replace an entire electronically controllable valve assembly, which will typically require a qualified plumber, the electronically controllable mixing valve cartridges have been designed to enable a mal-functioning electronically controllable mixing valve cartridge to be simply removed or withdrawn from a fixable valve fitting, and then a replacement electronically controllable mixing valve cartridge can be fitted into the now empty fixable valve fitting. The aim is to provide a cartridge that can be replaced simply and quickly, and ideally without requiring a qualified plumber to carry out the repair.

First Example

With reference to FIGS. 1 to 6, a first example of an electronically controllable mixing valve cartridge (11) will now be described. The first example of an electronically controllable mixing valve cartridge (11) has two fluid inlets (13) and one fluid outlet (15) and a temperature sensor (17). The cartridge (11) also has two movable valve members (19) and an actuator (21) configured to move each movable valve member (19). In this example, the actuators (21) are electrically powered actuators.

The cartridge (11) also includes an integral electronic control system (23) in the form of a printed circuit board. The electronic control system (23) is adapted to receive inputs or feedback from the temperature sensor (17) and inputs from an input device (not shown), to control the operation of the actuators (21). The input device can be a remote control panel, for example a panel with one or more push buttons, a touch screen or a control knob (24) style of input panel, ideally situated at eye level in a shower module.

As noted above, a feature of the cartridge (11) is that it has been configured to engage with a complimentary fixable valve fitting (25) to form a first mixing valve assembly (26). The valve cartridge (11) is in the form of a replaceable valve cartridge.

The fixable valve fitting (25) is fixable to a supporting member, for example it can be fastened to the framing timbers of a building. The fixable valve fitting (25) is permanently, or at least semi-permanently, connectable to the pipework of a plumbing installation of the building. The fixable valve fitting (25) can be connected using threaded pipe connections or glued pipe connections for example.

The fixable valve fitting (25) has two complimentary fluid outlets (27) and a fluid inlet (29). The engagement between the cartridge (11) and the fixable valve fitting (25) is capable of establishing a fluid tight sealed connection between the fluid inlets (13) and the fluid outlet (15) of the cartridge (11) and the complimentary fluid outlets (27) and the fluid inlet (29) of the fixable valve fitting (25).

The sealed connection between each fluid inlet (13) and the fluid outlet (15) of the valve cartridge (11) and the complimentary fluid outlets (27) and fluid inlet (29) of the fixable valve fitting (25) includes an elastomeric seal (31), for example an EPDM (ethylene propylene diene monomer) rubber O-ring (not shown). Each elastomeric seal (31) provides a fluid tight seal at the interface between a cartridge mating surface (33) on the valve cartridge (11) and a fixed mating surface (35) on the fixable valve fitting (25). The fluid inlets (13) and the fluid outlet (15) of the valve cartridge (11) are each situated on the cartridge mating surface (33) of the cartridge and these engage with the fluid outlets (27) and the fluid inlet (29) that are each situated on the fixed mating surface (35) of the fixable valve fitting (25).

The movable valve members (19) are ceramic valve members and they each mate with fixed ceramic valve seats (37). Each of the movable valve members (19) has a 'C_shaped bridging passage (36) that spans across and connects two ports in the mating valve seat (37) when the movable valve members (19) is in a fully open position. The 'C_shaped bridging passage (36) does not connect the two ports in the mating valve seat (37) when the movable valve members (19) is in a fully closed position. The movable valve members (19) provide control over flow rate when in intermediate positions between fully open and fully closed.

It can be seen in FIGS. 4 and 5 that each movable valve member (19) is sandwiched between its associated fixed valve seat (37) and a fixed ceramic top plate (38). Each valve sandwich comprises one top plate (38), one movable valve member (19) in the middle and one valve seat (37), and this valve sandwich is held firmly together between a valve housing body (39) and a valve housing base (40). During manufacture, the valve housing body (39) and the valve housing base (40) are clamped together to form a desired compressive loading on the valve sandwich and then the valve housing base (40) is permanently fixed to the valve housing body (39) using a suitable fastening method for example welding or bonding.

The electrically powered actuators (21) each include an electric motor (42) and a lead screw or screw jack (44). Each lead screw (44) comprises a threaded drive shaft (46) that is driven by its associated electric motor (42) and a complimentary threaded driven nut or sleeve (47). Each lead screw (44) is ideally a part of the electric motor (42), the lead screws (44) being a part of, or an extension of, the main shaft of the electric motors (42).

Each driven sleeve (47) is connected to one of the movable valve members (19) and is able to move in a linear direction to move its associated movable valve member (19), but is prevented from rotating by its connection to its associated movable valve member (19). The connection between each driven sleeve (47) and its associated movable valve member (19) having a square or rectangular key (58) on the end of each driven sleeve (47) that is sized to fit within a complimentary square or rectangular socket (59) in each movable valve member (19).

The components shown in FIG. 4 including the top plates (38), the movable valve members (19), the valve seats (37), the electrically powered actuators (21), the valve housing body (39) and the valve housing bases (40), when assembled together form a valve module assembly (49) as shown in FIG. 3. The valve module assembly (49) is secured to a cartridge body (41) of the cartridge (11) using six machine screws (50) as shown in FIG. 2. A fluid tight connection is made between the cartridge body (41) and the valve module assembly (49) is achieved using four sealing rings (51) that are configured to span between a top surface on the cartridge body (41) and an underside of the valve seats (37).

As noted above, the electronic control system (23) is adapted to receive inputs from a local or remote input device or user interface. The electronic control system (23) can receive the inputs via electromagnetic signals, for example via Wifi, Bluetooth or inductive data transfer.

The temperature sensor (17) is situated within the fluid outlet (15) of the valve cartridge (11) and provides temperature data which facilitates a closed loop electronic control system, and allows the cartridge to control the temperature of a fluid leaving the cartridge within a desired temperature range.

Two intermediate conduits (61) that lead to the fluid outlet (15) are configured to induce swirling into the fluid that is flowing through the fluid outlet (15). This swirling action is considered important as it accelerates the mixing of the fluids, for example the mixing of hot and cold water flows, and this allows a sufficiently accurate mixed fluid temperature measurement to be obtained before the fluid leaves the cartridge (11).

To facilitate this mixing action, the cartridge (11) includes a fluid mixing chamber (63), and the fluid mixing chamber (63) is situated within a fluid mixing module (65) of the cartridge (11). The principles of the fluid mixing module (65) will be explained in greater detail in the description of the second example below.

The valve cartridge (11) is configured to allow a mechanical fastening system to hold the valve cartridge (11) securely to the fixable valve fitting (25). In this example, an outer housing (53) is used to clamp the valve cartridge (11) to the fixable valve fitting (25). An internal thread on the outer housing (53) engages with an external thread (54) on the fixed valve member (25), and as the outer housing (53) is wound on to the external thread (54), an internal shoulder (not shown) in the outer housing (53) bears against an external shoulder (55) on the cartridge (11). In this way, the outer housing (53) is used to push the cartridge mating surface (33) toward the fixed mating surface (35) of the fixed valve member (25) compressing the O-rings that prevent leakage from the fluid connections.

In this first example the input device is a rotary control knob (24) fitted to a free end of the outer housing (53). Manual inputs from the rotary control knob (24) translated into electronic signals that are communicated to the printed circuit board (23) of the integral electronic control system of the cartridge (11), for example via electrical contacts, inductive data transfer, WiFi, etc.

The printed circuit board (23) is located within a slot (67) in a main body (69) and a cap (71) encloses the printed circuit board (23) and the electric motors (42) to protect these items.

The electronically controllable mixing valve cartridge (11) is ideally powered from a connection to an electrical mains system. The connection can be a wired connection via a connecting plug, or the electrical connection can be achieved via inductive power transfer or alternative contactless means. The cartridge (11) can also include means to hold stored electrical energy, for example capacitors or provisions for one or more batteries. The ability to hold stored electrical energy is advantageous in that the cartridge (11) can be configured to shut off the flow of water to a shower for example in the case of a mains power failure. This safety feature can minimise the chance of a person being scolded due to loss of control of the cartridge (11).

The same style of power supply and electrical storage or back up can be used in each one of the valve cartridges or valve assemblies described herein.

The example of an electronically controllable mixing valve cartridge (11) is configured to have a relatively small profile when viewed in the direction in which it is mated up to the fixed plumbing fitting, or fixable valve member (25). One of the features that allows this relatively small profile to be achieved is the feature in which a direction of flow of a fluid through the fluid inlets (13) and through the fluid outlet (15) is a direction of flow that is substantially aligned with a rotational axis of the electric motors (42). The direction of flow through the inlet ports (13) and through the outlet port (15) is also aligned with the direction of operation of the linear actuators or lead screws (44) and with a direction of movement of the movable valve members (19).

The relatively small profile allows the electronically controllable mixing valve cartridge (11) to be fitted through a relatively small opening in a wall. Ideally the valve cartridge (11) is able to fit through an opening of less than one hundred and sixty millimetres in diameter, and some of the valve cartridges that have been trial led and tested to date are able to fit through an opening of less than one hundred and twenty millimetres in diameter. Such a small size makes it possible to cover the valve cartridge (11) easily with a face plate or using the manual control knob (24), or with an electronic control panel or other user interface.

Second Example

With reference to FIGS. 7 to 11, a second example of an electronically controllable mixing valve cartridge (81) will now be described. The second example of an electronically controllable mixing valve cartridge (81) is similar to the first example of an electronically controllable mixing valve cartridge (11) except as will be outlined below.

A significant difference between the first example and this second example is that this second example mates with fluid connections on two faces of a second fixable valve fitting (83). Fluid inlets (85) of the valve cartridge are situated on a first mating face (87) of the valve cartridge (81), and a fluid outlet (89) of the valve cartridge (81) is situated on a second mating face (91). The valve cartridge (81) is configured to engage with fluid outlets (93) and fluid inlets (95) situated on two separate or different faces of a socket or cavity (97) of the fixable valve fitting (83). The first and second mating faces (87) and (91) are situated on a tongue section (99) of the cartridge (81), and the tongue section (99) is configured to fit within, and is complimentary to, the socket (97).

In this example, the tongue section (99) of the valve cartridge (81) is held securely within the socket (97) of the fixable valve fitting (83) by a single machine screw (101). The machine screw (101) engages with a threaded boss (103) on the fixable valve fitting (83).

A valve module assembly (105) of this second example of a valve cartridge (81) has the same basic components as the valve module assembly (49) used in the first example, but there are small differences in the components. These differences primarily relate to the fact that in this example fluid passes from one side of the valve module assembly (105) and out an opposite side.

The valve module (105) includes two top plates (107), two movable valve members (109), two valve seats (111), two electrically powered actuators (113), a valve housing body (115) and a valve housing base (117). Both the valve housing body (115) and the valve housing base (117) have two fluid ports. The valve housing body (115) contains the two fluid inlet ports (85) and the valve housing base (117) has two outlet ports (119). The two outlet ports (119) communicate with passages of a fluid mixing module (121) which will be explained below.

The top plates (107), the movable valve members (109) and the valve seats (111) each include a through passage. When the through passage of one of the movable valve members (109) aligns partially or fully with the through passages of its associated top plate (107) and the valve seat (111), fluid will flow through that movable valve member (109). Each movable valve member (109) is moved in a linear direction by its actuator (113) relative to its associated valve seat (111), and can be moved to a location where fluid flow is stopped, or to a range of locations to achieve a desired fluid flow rate.

This second example of a cartridge (81) includes a fluid mixing module (121) that operates in a similar manner to the fluid mixing module (65) of the first example above. The fluid mixing module (121) has two intermediate conduits (123) that each conduit leads fluid to an integral fluid mixing chamber (125). The mixing chamber (125) is situated in a region in which the fluid flows from each intermediate conduit (123) meet.

The fluid mixing module (121) is adapted to receive a flow of fluid from two separate sources and to combine the fluid flows, and to actively mix the fluid flows as they meet. In this case, fluid is received into each of the intermediate conduits (123) from the two outlet ports (119) respectively of the valve module (105). The fluid mixing module (121) actively mixes the two fluid flows by swirling each of the fluids together within the fluid mixing chamber (125).

The mixing chamber (125) has a first diameter (126) in a region where the incoming fluid flows enter the mixing chamber (125), and the mixing chamber (125) has a second and smaller diameter (127) where the mixed fluids exit the mixing chamber (125). The mixing chamber (125) includes a radiused funnelling section at the transition from the first diameter (126) to the second diameter (127).

The two fluid flows each enter the mixing chamber (125) at opposite sides of the mixing chamber (125). The fluid mixing module (121), or more specifically the intermediate conduits (123) are configured such that the fluid flows each enter the mixing chamber substantially in a direction that is tangential to the perimeter of the part of the mixing chamber (125) defined by the first diameter.

It can be seen in FIGS. 10 and 11 that the flow paths or the intermediate conduits (123) narrow as the flow paths approach the mixing chamber (125). This accelerates the fluids as they enter the mixing chamber (125) which helps to intensify the mixing action.

The fluid mixing module (121) includes a socket (128) which is configured to hold a temperature sensor (129) within the fluid outlet (89) of the valve cartridge (81). The fluid outlet (28) is essentially an exit section of the fluid mixing module (125). The temperature sensor (129) is situated to sense fluid temperature as the fluid exits the fluid mixing module (121).

The fluid mixing module (121) is an important part of the valve cartridge (81) as it allows accurate temperature measurements of the mixed water produced by the mixing valve module (105) and thereby allows closed loop control within the electronically controllable mixing valve cartridge (81).

The electrical components of the electronically controllable mixing valve cartridge (81) including the electrically powered actuators (113) and a printed circuit board (131) are housed within a cylindrical cap (133). The cylindrical cap (133) is fitted onto a main body (135) of the valve cartridge (81) and is held in place by the machine screw (101). While a cylindrical cap is used in this example, it is envisaged that the cap can (133) be of any shape.

This second example of an electronically controllable mixing valve cartridge (81) does not include an integral input device. A remote input device, for example a remote device with a touch screen or manually operated knobs can be used to provide the desired water temperature and this input will be relayed to the valve cartridge (81) via hard wiring or a contactless method such as WiFi, Bluetooth or inductive data transfer. Or alternatively a touch screen or a manually operated knob can be built into the electronically controllable mixing valve cartridge (81).

Third Example

With reference to FIGS. 12 to 15, a third example of an electronically controllable mixing valve cartridge (161) will now be described. The third example of an electronically controllable mixing valve cartridge (161) is similar to the first and second examples of an electronically controllable mixing valve cartridge (11) and (81) except as will be outlined below.

A significant difference with this third example (161) is that this third example is designed to fit within a cylindrical housing and mates with fluid connections on three faces of a third fixable valve fitting (163). One fluid inlet (165) of the valve cartridge (161) is situated on a first mating face (167) on one si de or end of the valve cartridge (161), a second fluid inlet (165) is situated on a second and opposite mating face (169) on an opposite side or end of the valve cartridge (161). And a fluid outlet (171) of the valve cartridge (161) is situated on a third mating face (173) which is situated between the first and second mating faces (167) and (169) and which faces a direction that is at right angles to these faces.

The valve cartridge (161) is configured to engage with fluid outlets (175) and a fluid inlet (177) situated on three separate or different faces of a cavity (179) within a central housing (181) of the fixable valve fitting (163). The first and second mating faces (167) and (169) are situated on opposite ends of a substantially cylindrical body (183) of the cartridge (161). And the third mating face (173) is situated on a flat base portion (185) on a side of the cylindrical body (183). The cylindrical body (183) is configured to fit within, and is complimentary to, the cavity (179).

The valve cartridge (161) has a display screen (187) situated on a second flat portion (189) of the cylindrical body (183). The second flat portion (189) is situated on an opposite si de of the substantially cylindrical body (183) when compared to the situation of the flat base portion (185). A printed circuit board (191) of the control system of the valve cartridge (161) is situated under the display screen (187).

The valve cartridge (161) is configured to sit within the central housing (181) of the fixable valve fitting (163). The fixable valve fitting (163) in this example is configured to connect up to a hot water pipe connection and a cold water pipe connection on a wall, the connections typically being spaced about 150 to 250 millimetres apart. In this way, the fixable valve fitting (163) is fixable to the plumbing system of a building.

With reference to FIGS. 14 and 15 it can be seen that the fixable valve fitting (163) comprises three main parts, a first end fitting (193) and a second end fitting (195), which are each fitted to opposite ends of the central housing (181). The first end fitting (193) includes a pipe fitting configured to connect to one of a pair of water pipe connections of a building, and the second end fitting (195) also includes a pipe fitting configured to connect to the other of the pair of water pipe connections.

The first end fitting (193) also includes one of the fluid outlets (175) of the fixable valve fitting (163) that are configured to mate with and form a fluid tight seal with a fluid inlet (165) of the cartridge (161). The second end fitting (195) is similarly configured to form a fluid tight seal with the other fluid inlet (165) of the cartridge (161). The central housing (181) includes the fluid inlet (177) of the fixable valve fitting (163) and this fluid inlet (177) is configured to mate with and form a fluid tight seal with the fluid outlet (171) of the cartridge (161). In this way, the fluid inlet (177) is situated in a central location between the two ends of the fixable valve fitting housing. The fluid inlet (177) of the fixable valve fitting (163) received temperature controlled water from the cartridge (177) and is typically connected to a shower head.

This third example of an electronically controllable mixing valve cartridge (161) has a fluid mixing module (not shown) that works in the same manner as the fluid mixing module (125) described with reference to the second example of a cartridge valve (81). The fluid mixing module of the third example of an electronically controllable mixing valve cartridge (161) is formed integrally within the cylindrical body (183) and sits directly below the valve components.

The valve module (197) of the third example of an electronically controllable mixing valve cartridge (161) is similar in most respects to the valve module of the first example of an electronically controllable mixing valve cartridge (11) described herein. The most notable difference being that the two electrically powered actuators (199) are each situated at opposite ends of the cylindrical body (183). In this way the two valve sandwich assemblies of the valve module (197) are a mirror image of the other, as compared to two identical valve assemblies in the valve module (49).

Also it should be noted that the cylindrical body (183) also forms the valve housing body and valve housing base of the valve module (197). A valve module top plate (201) is attached to the cylindrical body (183) using four machine screws (203) to keep the fixed and movable parts of the valve sandwich clamped together.

A temperature sensor (205) fits through a hole in the centre of the valve module top plate (201) and extends between the valve components and down to the fluid outlet (171) located in the flat base portion (185) of the cylindrical body (183).

In an alternative construction, the third fixable valve fitting (163) could be made as a single part that is connected to the hot water and cold water pipe connections on a wall. And the third fixable valve fitting (163) could include a mating surface that a modified version of the electronically controllable mixing valve cartridge (161) can be fitted to. The cartridge could include its own chromed cover and user interface. In this way, the cartridge could be replaced without having to disassemble the fixable valve fitting in any way.

Fourth Example

With reference to FIGS. 16 and 17, a mixing valve assembly (241) according to another aspect of the present invention will be described below. In this example, the mixing valve assembly (241) does not include the feature of a removable cartridge, however the mixing valve assembly does include a valve module assembly (243) that is similar to that used in the removable cartridge examples described herein.

The mixing valve assembly (241) essentially comprises a valve body (245) to which the valve module assembly (243) is fitted. The valve body (245) includes two fluid inlet ports and one mixed fluid outlet port. None of the fluid inlet or outlet ports communicate with the other except via the valve module assembly (243).

A first fluid inlet port (247) communicates with a first valve inlet port (249), and similarly, a second fluid inlet port (251) communicates with a second valve inlet port (253). And two valve outlet ports (255) communicate with a fluid outlet port (257) of the valve body (245).

The valve module assembly (243) has a flat base which mates with a machined face (261) on the valve body (245). The first and the second valve inlet ports (249) and (253) and the two valve outlet ports (255) are situated on the machined face (261). When the valve module assembly (243) is attached to the valve body (245) using six machine screws (263) a fluid tight seal is made between each of the ports (249), 253) and (255), and the corresponding ports on the bottom of the valve module assembly (243), using four elastomeric seals (265).

The construction and function of the valve module assembly (243) is similar to the valve module assembly (49) described with reference to the first example herein. The valve module assembly (243) has movable valve members (267), valve seats (269), valve top plates (271), electric motors (273) and lead screw assemblies having threaded drive shafts (275) and threaded driven sleeves (277).

The valve module assembly (243) is attached to a semi rectangular housing member (279) and the electric motors (273) and a printed circuit board (281) are housed within a cap (283) which snaps onto the rectangular housing member (279).

A temperature sensor (285) is fitted to the valve body (245) and is exposed to fluids passing out the fluid outlet port (257). The temperature sensor (285) allows closed loop temperature control to be achieved by the mixing valve assembly. Fluids flowing into the two valve outlet ports (255) are directed to enter a circular passage that leads to the fluid outlet port (257) at an angle that is tangential to a circle defining the circular passage. In this way, the fluids entering the circular passage are caused to swirl and this helps to ensure rapid mixing of the two streams of fluid or water. This mixing occurs immediately upstream of the temperature sensor (285).

As an alternative, the temperature sensor (285) could be included within the valve module assembly (243), being fitted within a fluid mixing chamber as with the first, second and third examples described herein.

Temperature inputs are received from a remote input device and can be relayed to the control system of the mixing valve assembly (241) using wires or wireless methods as with the cartridges described herein.

The mixing valve assembly (241) is a compact arrangement capable of closed loop temperature control and is easily installed into the plumbing pipework of a building, requiring just three pipe connections and an electrical power and data connection. Its size allows it to be installed easily within wall cavities and in locations that are convenient to suit the plumbing installation.

Fifth Example

With reference to FIGS. 18 to 26, a fifth example of an electronically controllable mixing valve cartridge (311) will now be described. The fifth example of an electronically controllable mixing valve cartridge (311) is in many ways similar to the second example of an electronically controllable mixing valve cartridge (81) described herein. A principal difference between the fifth example of an electronically controllable mixing valve cartridge (311) and the second example of an electronically controllable mixing valve cartridge (81) is the route of the mixed fluid as it exits the valve cartridge (311). With the valve cartridge (311), the mixed fluid exits through a mixed fluid outlet conduit (313) that is situated between a first fluid control valve assembly (315) and a second fluid control valve assembly (317).

The new direction of flow of the mixed fluid provides a configuration in which two inlet ports (319) and an outlet port (321) are all located on a single side of the valve cartridge (311), and are in fact all located on a single flat mating face (323). The single mating face (323) allows the valve cartridge (311) to be mated with, and fastened to, a single mating face of a fixed valve member (325). In this example the valve cartridge (311) is bolted to the fixed valve member (325) using two machine screws (not shown) that pass through machine screw holes (327) situated near an outer edge of a valve member housing (329). The valve member housing (329) is shared by both the first fluid control valve assembly (315) and the second fluid control valve assembly (317).

Another notable difference between the fifth example of an electronically controllable mixing valve cartridge (311) and the second example of an electronically controllable mixing valve cartridge (81) is the position of a temperature sensing means (331) and the addition of a flow sensing means (333). The temperature sensing means (331) and the flow sensing means (333) are each fitted through an aft face of a mixing and sensing module (337).

Each fluid control valve assembly (315 and 317) has a movable valve member (339) and two fixed valve members (341), and a valve actuation device (343). Each fluid control valve assembly (315 and 317) is configured such that when in use its associated movable valve member (339) is moved by the valve actuation device (343) in a linear motion relative to the two fixed valve members (341) to control the flow of a fluid through each fluid control valve assembly.

The movable valve member (339) is sandwiched between the two fixed valve members (341), and all of the valve members (339 and 341) are made of a ceramic based material.

All of the valve members (339 and 341) are elongate in shape, having straight sides and rounded ends, and having a length that is approximately twice as long as their width. The linear movement of the movable valve member (339) is aligned with the length of the elongate shape.

The movable valve member (339) and the two fixed valve members (341) each include a passage (345) through which the flow of a fluid is controlled by the position of the movable valve member (339) relative to the two fixed valve members (341). When the passage (345) in the movable valve member (339) is completely aligned with the passages (345) in the two fixed valve members (341) maximum fluid flow will occur. And zero flow will occur when the passages (345) do not overlap at all, and a range of flows will occur at point in between, with increased flow as the passages (345) move toward complete alignment.

The valve actuation device (343) can include a manually operated lever or a rotatable knob or handle, or a powered actuator, etc.; and in this example, the valve actuation device (343) is a powered actuator that includes an electric motor (347) and a linear actuator (349). The linear actuator (349) is coupled to the movable valve member (339). In this example, the linear actuator (349) is in the form of a simple lead screw assembly.

A threaded spindle (351) of the lead screw assembly is an integral part of a main shaft of the electric motor (347), and in this way the threaded spindle (351) is driven directly by the electric motor. The lead screw assembly also includes a driven nut or sleeve (353), the nut or sleeve (353) having a thread that is complimentary to a thread on the threaded spindle (351).

The sleeve (353) is linked or coupled directly to the movable valve member (339). In this example the coupling is achieved by mating a 'T_shaped protrusion (355) on a free end of the sleeve (353) with a complimentary 'T_shaped slot (357) in one end of the movable valve member (339). The 'T_shaped slot (357) is configured to allow the complimentary protrusion (355) to slide into engagement with the slot (357) while at the same time preventing rotation of the protrusion (355) relative to the movable valve member (339).

Linear movement of the sleeve (353) relative to the movable valve member (339) in the intended direction of movement of the movable valve member (339) when in use, is also prevented by the 'T_shaped joint between the protrusion (355) and the slot (357).

Each fluid control valve assembly (315 and 317) includes a valve member housing (329) that is configured to hold its movable valve member (339) in sealing contact with the fixed valve members (341). In this example a single valve member housing (329) houses both fluid control valve assemblies (315 and 317) and the valve member housing (329) includes guides (361) configured to guide the linear movement of the movable valve member (339) and to hold the fixed valve members (341) in place.

In this example, the valve member housing (329) comprises a box member (363) and a lid member (364), the two housing members (363) and (364) both being made of a relatively rigid plastics material and being welded together to hold and enclose the movable valve member (339) and the two fixed valve members (341). The valve member housing (329) also includes the fluid inlet ports (319) and the mixed fluid outlet conduit (313) which terminates at the fluid outlet port (321).

The electric motor (347) is attached to the outside of the valve member housing (329) and is held fixed relative to the valve member housing (329). The two electric motors (347) that are used in the electronically controllable mixing valve cartridge (311) are housed within a motor housing that comprises a motor baseplate housing member (365) and a motor cover housing member (366).

The fifth example of an electronically controllable mixing valve cartridge (311) also includes a mixing and sensing module (337). The mixing and sensing module (337) has a body (371), a temperature sensing means (331) and a flow sensing means (333). The body (371) has two inlet regions (377), a mixing chamber (379) and an outlet region (381). The mixing chamber (379) is situated downstream of the movable valve members (339) and upstream of the temperature sensing means (331).

In this example, the two inlet regions (377) and the outlet region (381) are all located on the same side of the body (371). In this way, the mixing and sensing module (337) is able to receive two separate fluid flows from the valve member housing (329) and to combine or mix the two fluid flows, and to then direct the mixed fluid back through the mixed fluid outlet conduit (313) in the valve member housing (329).

The mixing chamber (379) is in communication with the two inlet regions (377) and is in communication with the outlet region (381). The two inlet regions (377) are each connected by an associated transfer passage (383) to the mixing chamber (379). Each transfer passage (383) is tapered and narrows in the direction of flow and is configured to induce a swirling motion in a fluid when the fluid enters the mixing chamber (379).

The mixing chamber (379) is a cylindrical mixing chamber and the transfer passages (383) each direct the fluid in a direction that is substantially tangential to a circle defining a perimeter of the cylindrical mixing chamber (379). The cross sectional area of the transfer passages (383) reduces in a direction of flow towards the mixing chamber (379). The transfer passages (383) have a larger cross sectional area adjacent to the inlet regions (377) than adjacent to the mixing chamber (379), and because the fluid is forced to move through a narrowing gap the fluid is accelerated as it moves toward the mixing chamber (379).

The temperature sensing means (331) includes a temperature sensing element (385) that is situated such that the sensing means (331) is able to sense the temperature of the fluid as the fluid passes toward or through the outlet region (381) or within the mixed fluid outlet conduit (313).

The flow sensing means (333) includes a rotatable element (387) that is rotated by swirling fluid within the mixing chamber (379). The rotatable element (387) is in the form of a paddle wheel. The temperature sensing element (385) is supported on a probe or shaft (389), and the rotatable element (387) is supported by the shaft (389) and rotates about an axis that is coaxial with the shaft (389). The rotatable element (387) is held securely on the shaft (389) by a locking collar (390). The rotatable element (387) includes one or more magnetic sensing objects that are configured to be sensed by a magnetic or proximity sensing transducer (391), for example a hall effect transducer, of the flow sensing means (333).

The module body (371) has two substantially flat and parallel faces, a first face (393) containing the inlet regions (377) and the outlet region (381), and a second face (395) through which the temperature sensing element (385) is installed. The mixing chamber (379) is situated between the first face (393) and the second face (395). The flow of fluid into the inlet regions (377) and the flow of fluid out of the outlet region (381) are all flows that pass through a single plane of the first face (393).

In this example, two fluid control valve assemblies (315 and 317) and a mixing and sensing module (337) are combined to form an electronically controllable mixing valve assembly The mixing valve assembly is a key part of the replaceable valve cartridge (311). The replaceable valve cartridge (311) further includes a control system which includes an integrated circuit (397) that is configured to receive inputs from the mixing and sensing module (337) and to control the operation of the electric motors (347) of each fluid control valve assembly (315 and 317). The integrated circuit (397) is housed within a control box housing (399) and a control box lid (401) that are secured to the module body (371). As with the other examples described herein, the control system is configured to receive command inputs from a range of means, for example manually turned knobs, Wifi, Bluetooth or other data transmissions, etc.

A s noted above, the replaceable valve cartridge (311) has two inlet ports and one outlet port that are all situated on a single mating feature in the form of a substantially flat mating face (323). The substantially flat mating face (323) includes formations in the form of O-ring grooves configured to retain elastomeric O-ring seals. The elastomeric seals are situated about the connection of each inlet and outlet port (319 and 321) to the fixable valve fitting (325) and are used to produce leak resistant seals. The leak resistant seals are established between the mating face (323) of the valve cartridge (311) and a complimentary mating feature of the fixable valve fitting (325), the complimentary mating feature of the fixable valve fitting (325) being a substantially flat face that contacts and compresses the elastomeric seals.

The replaceable valve cartridge (311) is configured to enable, or to allow, a mechanical fastening system to hold the replaceable valve cartridge securely to a fixable valve fitting (325). In this example, just two machine screws (not shown) are passed through the two machine screw holes (327) and are screwed into two internally threaded bores in the fixable valve fitting (325) and are tightened to clamp the valve cartridge (311) to the fixable valve fitting (325) in a manner that compresses the elastomeric O-ring seals to form the leak resistant seals. This attachment and sealing method allows simple and quick replacement of the replaceable valve cartridge (311) as required, and this replacement could be carried out without any specialised plumbing training.

The fixable valve fitting (325) is an item of plumbing hardware that can be permanently installed in a plumbing system and fixed to the structure of a building. The fixable valve fitting (325) is permanently connected to two fluid supplies, for example to a hot and a cold water supply, and is permanently connected to an outlet pipe, for example a pipe that supplies temperature controlled water to a shower rose. This arrangement allows the valve cartridge (311) to be replaced or repaired without having to break any of the permanent plumbing connections.

The valve cartridge (311) or the fixable valve fitting (325) could be fitted with a filter and a non-return check valve if desired.

While the valve cartridge (311) could be powered by a wired connection to a power supply, it is envisaged that the valve cartridge (311) could alternatively be powered by inductive power transfer. For example an inductive power transfer module could be provided in the fixable valve fitting (325) and a corresponding inductive power transfer module could be provided in the valve cartridge (311), with the two inductive power transfer modules being adjacent one another when the valve cartridge (311) is connected to the fixable valve fitting (325).

A working model of the valve cartridge (311) has been constructed and tested by the inventors. The constructed valve cartridge (311) has a size of 90×80×64 mm and can handle flow rates in the region of fourteen litres per minute, which is more than enough for most domestic showers. This cartridge size compares to competing electronically controllable mixing valve modules presently on the market that have a size of 240×180×68 mm. This dramatic reduction in overall size allows the valve cartridge (311) to be fitted in much more convenient and accessible locations, for example the valve cartridge (311) can be fitted into the shower control modules, fittings or housings that are presently designed to house manually operated shower mixing valves.

In FIG. 26 an alternative box member (363A) for the valve member housing (329) is shown. In this alternative box member (363A) the passages leading to the alternatively placed inlet ports (319A) and the alternatively placed outlet port (321A) are passages having a right-angled bend so that the inlet ports (319A) and the outlet port (321A) are situated on a face that is at right angles to the direction of operation of the linear actuators (349).

In this alternative configuration, a direction of flow of a fluid through the fluid inlets (319A) and through the fluid outlet (321A) is a direction of flow that is substantially aligned with a rotational axis of the electric motors (347). The direction of flow through the inlet ports (319A) and through the outlet port (321A) is also aligned with the direction of operation of the linear actuators (349) and with a direction of movement of the movable valve members (339).

This alternative configuration allows the electronically controllable mixing valve cartridge (311) to be constructed in a manner that has a smaller profile when viewed in the direction in which the valve cartridge (311) mates to the fixable valve fitting (325). That is, with this alternative configuration, the valve cartridge (311) is able to fit through a smaller opening in a wall or shower lining, as a result of the smaller profile, when being fitted to the fixable valve fitting (325). In this way, the electronically controllable mixing valve cartridge (311) can be used in a similar manner to the first example of an electronically controllable mixing valve cartridge (11) as shown in FIG. 6.

Sixth Example

With reference to FIGS. 26 and 27 an alternative valve member configuration (411) will now be described. The alternative valve member configuration (411) can be used in electronically controlled mixing valve cartridges of the type described herein, with appropriate modifications to the valve member housings to provide two inlet supplies to a single set valve members that can be used to control mixing using only a single actuator.

The single actuator comprises an electric motor (413) and a lead screw assembly (415) similar to the actuators shown in the other examples herein. A significant difference with the alternative valve member configuration (411) is that a single movable valve member (417) is used to control two inlet ports provided in a first fixed member (419). A first inlet port (421) of the inlet fixed member (419) can be connected to a cold water supply for example, and a second inlet port (423) of the inlet fixed member (419) can be connected to a hot water supply.

As with the other examples described herein the movable valve member (417) is sandwiched between two fixed valve members, all of the valve members being made of a ceramic material. In this case, the movable valve member (417) is sandwiched between the first fixed member (419) and a second fixed member (425). The second fixed member (425) has an outlet port (427). The outlet port (427) has a similar overall size to the perimeter of the first and second inlet ports (421 and 423) combined. The movable valve member (417) has a control port (429) which is approximately half the size of the outlet port (427).

It can be said that the movable valve member (417) is moved by the actuator to and through four regions;

- a first region where the control port (429) is completely covered by a solid region of the first fixed member and in which no fluid will pass through the valve member assembly,
- a second region where the control port (429) overlies the first inlet port (421) of the first fixed member and in which only fluid from the first inlet port (421) is able to pass through the valve member assembly,
- a third region where the control port (429) overlies both the first inlet port (421) and the second inlet port (423) of the first fixed member and in which fluid from both the first inlet port (421) and the second inlet port (423) is able to pass through the valve member assembly, and
- a fourth region where the control port (429) overlies the second inlet port (423) of the first fixed member and in which only fluid from the second inlet port (423) is able to pass through the valve member assembly.

In this way the alternative valve member configuration (411) is able to control mixing of two fluid flows using only a single actuator. The alternative valve member configuration (411) can be used in conjunction with a temperature sensor and an electronic control system to produce an electronically controllable mixing valve cartridge of the type described herein.

Variations

Aspects of the present invention have been described by way of example only and it should be appreciated that modifications and additions may be made thereto without departing from the scope thereof.

A number of the mixing valve assemblies described herein include just one electronically controllable mixing valve cartridge, however it is envisaged that more than one cartridge could be used, for example an assembly that is supplying multiple showerheads from separate input panels.

The valve module assemblies described herein include movable valve members that are moved in a linear manner. It is envisaged that in an alternative embodiment the valve module assemblies could include rotatable movable valve members, for example the quarter turn ceramic valve discs that are commonly used in hand operated mixing valves.

Similarly, the examples described herein all include two electrically powered actuators and two mating pairs of valve members, but it is envisaged that the valves could include only a single pair of mating valve members and be operated by a single actuator.

The valves described herein include two fluid inlets and one fluid outlet, however it is envisaged that the same operating principles and componentry could be used to manage more than two fluid inlets and any number of fluid outlets. Similarly, more than one temperature sensor could be used to suit an alternative embodiment.

The movable valve members and the fixed valve members are made of ceramic material and can each be made of a different ceramic material to reduce friction, for example a pair of mating valve members can include one made of alumina, and the other could be made of zirconia, silicon carbide or silicon nitride.

In the examples described herein the two housing members are made of a plastics material and are welded together. However, it is envisaged that the two housing members can be held together with mechanical fasteners, and they can be made of metal, for example from brass.

The examples described herein all have electrically powered actuators. It is envisaged that other means of powering the actuators could be used, for example hydraulically powered actuators (for example using water pressure), or pneumatic powered actuators.

The electronic control systems of any of the valve cartridges or mixing valve assemblies can be adapted to receive mechanical inputs from a local input device or user interface having a manually operated knob, lever or similarly manually controlled device.

The electronically controllable mixing valve cartridge can include one or more flow sensors if desired, for example for use in managing water usage or as an alternative method of controlling temperature.

Optionally the electronically controllable mixing valve cartridges can include a turbine generator configured to generate electrical energy when fluid is flowing through the valve cartridge.

The electronically controllable mixing valve cartridges can also include an emergency shut-off valve, for example a wax tube operated shut off or diverter valve configured to prevent fluid above a selected temperature from exiting the valve cartridge, for improved safety especially in the event of a power failure.

The electronically controllable mixing valve cartridges can also include a manually operated flow control and shut-off valve for improved safety and to reduce the work done by the actuators. With this option the actuators only control flow rates and do not control the shut-off role, and in this way the power used by the electronically controllable mixing valve cartridges can be reduced.

It is envisaged that the coupling between the electric motors and the movable valve members could take a variety of forms. For example, in an alternative embodiment the movable valve members could be coupled directly to their respective electric drive motors via a threaded joint. A threaded shaft that is a part of, or is connected to the movable valve members, could engage with an internal thread formed in a main shaft of the electric motor as one option.

The mechanical connection between the linear actuators and the movable valve members that includes engaging 'T_shaped slots and protrusions could alternatively have the protrusion on the movable valve members and the slot on the linear actuator.

It is considered viable that one or more of the fixed valve members can be in the form of a valve seat formed in the valve member housing. It is envisaged that the valve technology described herein could also be used to produce a flow control valve, for example a flow control valve having one inlet and one outlet and a flow sensor.

Definitions

Throughout this specification the word "comprise" and variations of that word, such as "comprises" and "comprising", are not intended to exclude other additives, components, integers or steps.

Advantages

Thus it can be seen that at least the preferred form of the invention provides an electronically controllable mixing valve cartridge which can be installed and replaced with greater simplicity and ease, and therefor at a reduced labour cost. The relatively small size of the valve cartridges mean that they can be installed in the same place, and be coupled to the same style of fittings, as the manually operated mixing valves in use today.

The design of the cartridges is also intended to reduce the valve size and the valve cost without impairing the expected reliability of the electronically controllable valves that it forms a part of.

The mixing valve assemblies are similarly simple and small allowing lower cost manufacture and greater flexibility with installation.

The use of two valve assemblies in the mixing valves allows both total flow rate and mixing to be adjusted or controlled separately.

The use of ceramic valve members provides reliable sealing and long life.

The linear motion of the movable valve members allows the use of a relatively small electric motor in combination with a lead screw to provide actuation, the actuation means being low cost and powerful enough to move the movable valve members reliably, even if they become partly stuck, for example stuck due to the valve drying out.

The mixing and sensing module described herein allows useful feedback concerning temperature and flow to be obtained within a very compact valve cartridge. The swirling action in the mixing chamber mixes the two fluid flows rapidly and the mixing chamber provides a suitable location for a flow sensing paddle wheel.

The combination of reliable valve operation and accurate feedback provides a very convenient electronically controlled mixing valve cartridge that can be easily configured for simple installation and removal.

The invention claimed is:

1. An electronically controllable mixing valve cartridge, the valve cartridge comprising:
   at least two fluid inlets and at least one fluid outlet,
   at least one movable valve member and at least one actuator configured to move the or each movable valve member in a manner that controls the flow of fluid from each of the at least two fluid inlets and to the at least one fluid outlet,
   at least one temperature sensor situated within the valve cartridge and within a fluid flow path that flows between the at least one movable valve member and the at least one fluid outlet,
   an electronic control system situated within the valve cartridge and configured for receiving inputs from an input device and adapted to receive inputs from the or each temperature sensor and to control the operation of the or each actuator to achieve a selected fluid temperature at the at least one fluid outlet when in use,
   a mixing chamber that is situated downstream of the or each movable valve member and upstream of the at least one temperature sensor, and at least two transfer passages that connect each of the fluid inlets separately to the mixing chamber, wherein the mixing chamber has a first diameter in a region where incoming fluid flows into the mixing chamber, and the mixing chamber has a second diameter where mixed fluid exits the mixing chamber, the second diameter being smaller than the first diameter, wherein the mixing chamber includes a radiused funnelling section at a transition from the first diameter to the second diameter, and wherein the at least two fluid flows from the fluid inlets are introduced separately into the mixing chamber at opposite sides of a perimeter of the mixing chamber so that the mixing chamber receives the at least two separate fluid flows from the opposite sides of the perimeter of the mixing chamber and in different directions, via the transfer passages and into a region of the mixing chamber that is between the first diameter and the second diameter of the mixing chamber, in a manner that produces a swirling motion within the mixing chamber, when the valve cartridge is in use.

2. The valve cartridge as claimed in claim 1, wherein the or each actuator includes an electric motor.

3. The valve cartridge as claimed in claim 1, wherein the or each actuator includes a linear actuator.

4. The valve cartridge as claimed in claim 1, wherein the valve cartridge is configured for engagement with a complimentary fixable valve fitting that is connectable to the pipework of a plumbing installation and has complimentary fluid outlets and a fluid inlet or fluid inlets.

5. The valve cartridge as claimed in claim 4, wherein the valve cartridge includes one or more mating features configured for establishing a sealed connection between each fluid inlet and the or each fluid outlet of the valve cartridge and the complimentary fixable valve fitting.

6. The valve cartridge as claimed in claim 1, wherein the mixing chamber is substantially cylindrical in shape and the transfer passages are each configured to direct the fluid in a direction that is substantially tangential to a circle defining the perimeter of the cylindrical mixing chamber.

7. The valve cartridge as claimed in claim 6, wherein a cross sectional area of the transfer passages reduces in a direction of flow towards the mixing chamber.

8. The valve cartridge as claimed in claim 1, wherein the valve cartridge also includes a flow sensor.

9. The valve cartridge as claimed in claim 3, wherein the or each linear actuator includes a lead screw assembly.

10. The valve cartridge as claimed in claim 1, wherein the or each movable valve member is a ceramic valve member.

11. The valve cartridge as claimed in claim 1, wherein the or each movable valve member is elongate in shape, and a linear movement of the movable valve member is aligned with a length of the elongate shape.

12. The valve cartridge as claimed in claim 1, wherein the at least two fluid inlets and the at least one fluid outlet are all situated on a single substantially flat face.

13. The valve cartridge as claimed in claim 1, wherein the valve cartridge is configured to enable a mechanical fastening system to hold the valve cartridge securely to a fixable valve fitting.

14. The valve cartridge as claimed in claim 5, wherein the valve cartridge includes transfer passages through which fluid flows as the fluid approaches the mixing chamber, and the transfer passages are configured to create a swirling motion within the mixing chamber.

15. The valve cartridge as claimed in claim 14, wherein the mixing chamber is substantially cylindrical in shape and the transfer passages are each configured to direct the fluid in a direction that is substantially tangential to a circle defining a perimeter of the cylindrical mixing chamber.

16. The valve cartridge as claimed in claim 6, wherein the valve cartridge also includes a flow sensor.

17. The valve cartridge as claimed in claim 16, wherein the flow sensor includes a rotatable element that is rotated by swirling fluid within the mixing chamber.

18. The valve cartridge as claimed in claim 17, wherein a temperature sensing element of the temperature sensor is supported on a probe or shaft, and the rotatable element rotates about an axis that is coaxial with the shaft or probe.

19. An electronically controllable mixing valve assembly including the electronically controllable mixing valve cartridge as claimed in claim 1 and a fixable valve fitting, the electronically controllable mixing valve cartridge being connectable to the fixable valve fitting using a mechanical fastening system, and the fixable valve fitting being connectable to a plumbing system of a building and configured to direct fluid to the at least two fluid inlets of the valve cartridge and to receive fluid from the at least one fluid outlet of the valve cartridge, and being configured to allow leak resistant seals to be established between the or each mating feature of the electronically controllable mixing valve cartridge and complimentary mating features of the fixable valve fitting.

20. An electronically controllable mixing valve cartridge, the valve cartridge comprising:
at least two fluid inlets and at least one fluid outlet,
at least one movable valve member and at least one actuator configured to move the or each movable valve member in a manner that controls the flow of fluid from each of the at least two fluid inlets and to the at least one fluid outlet,
at least one temperature sensor situated within the valve cartridge and within a fluid flow path that flows between the at least one movable valve member and the at least one fluid outlet,
an electronic control system situated within the valve cartridge and configured for receiving inputs from an input device and adapted to receive inputs from the or each temperature sensor and to control the operation of the or each actuator to achieve a selected fluid temperature at the at least one fluid outlet when in use,
a mixing chamber that is situated downstream of the or each movable valve member and upstream of the at least one temperature sensor, and at least two transfer passages that connect each of the fluid inlets separately to the mixing chamber,
wherein the mixing chamber has a first diameter in a region where incoming fluid flows into the mixing chamber, and the mixing chamber has a second diameter where mixed fluid exits the mixing chamber, the second diameter being smaller than the first diameter,
wherein the at least two fluid flows from the fluid inlets are introduced separately into the mixing chamber at opposite sides of a perimeter of the mixing chamber so that the mixing chamber receives the at least two separate fluid flows from the opposite sides of the perimeter of the mixing chamber and in different directions, via the transfer passages and into a region of the mixing chamber that is between the first diameter and the second diameter of the mixing chamber, in a manner that produces a swirling motion within the mixing chamber, when the valve cartridge is in use, and wherein the or each actuator includes a linear actuator.

* * * * *